United States Patent [19]
Ito et al.

[11] Patent Number: 5,808,925
[45] Date of Patent: Sep. 15, 1998

[54] ARITHMETIC UNIT AND METHOD FOR FOURIER TRANSFORM

[75] Inventors: Osamu Ito, Tokyo; Yasunari Ikeda, Kanagawa, both of Japan

[73] Assignee: Sony Corporation, Tokyo, Japan

[21] Appl. No.: 643,233

[22] Filed: May 2, 1996

[30] Foreign Application Priority Data

May 25, 1995 [JP] Japan .................................. 7-126227

[51] Int. Cl.⁶ .................................................. G06F 17/14
[52] U.S. Cl. ....................................................... 364/726.04
[58] Field of Search .......................... 364/726.04, 726.02

[56] References Cited

U.S. PATENT DOCUMENTS

| | | | |
|---|---|---|---|
| 3,702,393 | 11/1972 | Fuss | 364/726.02 |
| 3,892,956 | 7/1975 | Fuss | 364/726.04 |
| 4,058,715 | 11/1977 | Niwa | 364/726 |
| 4,534,009 | 8/1985 | McGee | 364/726.04 |
| 5,293,330 | 3/1994 | Sayegh | 364/726 |
| 5,365,470 | 11/1994 | Smith | 364/726.04 |

OTHER PUBLICATIONS

Bidet et al., "A Fast Single–Chip Implementation of 8192 Complex Point FFT"; IEEE J. of Solid Date Circuits, vol. 30, No. 3, Mar. 1995, pp. 1666–1668.

Antola, "Multiple–Transform Pipelines for Image Coding: Structural Definition"; Signal Processing IV: 1988, pp. 1665–1668.

*Primary Examiner*—David H. Malzahn
*Attorney, Agent, or Firm*—Jay H. Maioli

[57] ABSTRACT

A Fourier transform arithmetic unit is reduced in cost and size by reducing the number of delay circuits. Data corresponding to each of input symbols is successively divided into quarters by a distribution switch. The first-quarter data is delayed by a delay circuit three times, that is, delayed by a total of 3N/4 (N: the number of data items of one symbol). The second-quarter data is delayed by a second delay circuit two times, that is, delayed by a total of N/2. The third-quarter data is delayed by N/4 by a third delay circuit. The fourth-quarter data is not delayed. These quarters of the input data are supplied to first to fourth input terminals of a butterfly operation device simultaneously with each other, data items in each quarter being input one after another. The butterfly operation device performs the butterfly operation using the data and outputs the operation result.

18 Claims, 18 Drawing Sheets

FIG. 10

| INPUT DATA | BINARY NOTATION | BIT REVERSE | OUTPUT ORDER | CALCULATION ORDER (Z) |
|---|---|---|---|---|
| G0 | 0000 | 0000 | 0 | 1 |
| G1 | 0001 | 1000 | 8 | 1 |
| G2 | 0010 | 0100 | 4 | 2 |
| G3 | 0011 | 1100 | 12 | 2 |
| G4 | 0100 | 0010 | 2 | 3 |
| G5 | 0101 | 1010 | 10 | 3 |
| G6 | 0110 | 0110 | 6 | 4 |
| G7 | 0111 | 1110 | 14 | 4 |
| G8 | 1000 | 0001 | 1 | 5 |
| G9 | 1001 | 1001 | 9 | 5 |
| G10 | 1010 | 0101 | 5 | 6 |
| G11 | 1011 | 1101 | 13 | 6 |
| G12 | 1100 | 0011 | 3 | 7 |
| G13 | 1101 | 1011 | 11 | 7 |
| G14 | 1110 | 0111 | 7 | 8 |
| G15 | 1111 | 1111 | 15 | 8 |

5,808,925

ARITHMETIC UNIT AND METHOD FOR FOURIER TRANSFORM

BACKGROUND OF THE INVENTION

1. Field of the Invention

The present invention relates to an arithmetic unit and a method for Fourier transform and, more particularly, to a Fourier transform arithmetic unit having a simpler circuit configuration in which the number of delay circuits and other circuits is reduced and to a method of Fourier transform performed by the Fourier transform arithmetic unit.

2. Description of the Related Art

Conventionally, high-speed Fourier transform is performed by using a software means, i.e., programmed operation of a digital signal processor (DSP). However, since such a software means requires a long processing time, IC chips (special hardware) for performing arithmetic processing for high-speed Fourier transform have recently been brought into use.

Such hardware means is arranged in such a manner that one butterfly operation circuit is repeatedly used or a plurality of butterfly operation circuits are connected in parallel with each other.

If operations are performed by one butterfly operation circuit, a memory (RAM) for storing input data successively processed and a multiplying clock for performing arithmetic processing at a high speed are required.

In the case where a plurality of butterfly operation circuits are used, a plurality of RAMs for storing intermediate operation results are required.

If the number N of points of Fourier transform is thereby increased, the circuit scale is increased and a need for external IC chips and a high-speed multiplying clock arises, so that it is difficult for the entire system to be formed in one IC chip.

Then, processing data in a pipeline processing manner as shown in FIG. 11, for example, may be taken into consideration. In the example shown in FIG. 11, input data is divided into two groups of data: one corresponding to the first half of one symbol (data supplied precedently with respect to time) and the other corresponding to the second half (data supplied by being delayed) by a distribution switch 1 of a processing circuit forming a first processing stage. The first-half data is supplied to a delay circuit 2 which delays the data by an amount of time corresponding to N/2 (N: the number of data items (number of points) of one symbol). After being delayed by N/2, the data is supplied to one (first) input of terminal (shown as an upper input terminal in FIG. 11) of a butterfly operation device 4.

The second-half data separated by the distribution switch 1 is supplied to a multiplier 3 for the twiddle factors which performs multiplication using complex coefficients stored in a memory such as a ROM (not shown). After undergoing multiplication for the twiddle factors in the multiplier 3, the data is supplied to the other (second) input terminal (shown as a lower input terminal in FIG. 11) of the butterfly operation device 4. The butterfly operation device 4 performs a butterfly operation on the two inputs and then outputs the result of the operation to a processing circuit forming a subsequent stage (second-stage).

In the second-stage processing circuit, the data output from one (first) output terminal (upper output terminal in FIG. 11) of the first-stage butterfly operation device 4 is supplied to one (first) input terminal (shown as an upper input terminal in FIG. 11) of a changing switch 6-1 while the data output from the other (second) output terminal (lower output terminal in FIG. 11) of the butterfly operation device 4 is delayed by N/4 by a delay circuit 5-1 and then supplied to the other (second) input terminal (shown as a lower input terminal in FIG. 11) of the changing switch 6-1. The changing switch 6-1 suitably changes the data input through its two input terminals and outputs the changed data through its two output terminals.

The data output from one (first) output terminal of the changing switch 6-1 is delayed by N/4 by a delay circuit 7-1 and then supplied to one (first) input terminal of a butterfly operation device 9-1. On the other hand, the data output from the other (second) output terminal of the changing switch 6-1 undergoes multiplication for the twiddle factors in a multiplier 8-1 for the twiddle factors and is then supplied to the other (second) input terminal of the butterfly operation device 9-1. The butterfly operation device 9-1 performs butterfly operation of the data input through its two input terminals and outputs the result of the operation through two output terminals.

Third-stage and other subsequent processing circuits have the same configuration as the second-stage processing circuit. However, the delay time of delay circuits 5-$i$ and 7-$i$ in the processing circuit forming each intermediate stage is ½ of that in the processing circuit forming the preceding stage.

In the processing circuit forming a stage which is subsequent to the stage in which the delay time of delay circuits 5-$k$ and 7-$k$ is 1 in terms of the number of data items, the data output from one (first) output terminal of butterfly operation device 9-$k$ of the processing circuit forming the preceding stage is supplied directly to one (first) input terminal of a change-over switch 11 while data output from the other (second) output terminal of butterfly operation device 9-$k$ is delayed by N/2 by a delay circuit 10A and then supplied to the other input terminal of the change-over switch 11. The change-over switch 11 is arranged to change the data input through the two input terminals into data in serial form and to output this data, and the output from the change-over switch 11 is rearranged by a rearrangement circuit 12.

Actually, butterfly operation is achieved by performing both the processing of butterfly operation device 4 and the processing of the multiplier 3 for the twiddle factors in the first-stage processing circuit, for example. In this specification, for ease of description, processing including no multiplication for the twiddle factors is referred to as butterfly operation (butterfly operation in a narrow sense).

The operation of this processing system will next be described. The distribution switch 1 divides each series of data input with respect to unit symbols into first-half data (half data supplied precedently with respect to time) and second-half data (half data supplied after with respect to time). The distribution switch 1 supplies the first-half data to the delay circuit 2 and supplies the second-half data to the multiplier 3 for the twiddle factors. The delay circuit 2 delays the input first-half data by N/2 (i.e., an amount corresponding to half data of one symbol) and supplies the delayed data to one of the two input terminal of the butterfly operation device 4.

At this time, the second-half data, having been output from the distribution switch 1 and having undergone multiplication for the twiddle factors in the multiplier 3, is supplied to the other input terminal of the butterfly operation device 4. (The multiplication time of the multiplier 3 for the twiddle factors has been ignored. If this multiplication time is not negligible, the delay time of the delay circuit 2 is set by also considering this multiplication time. Time setting is also made in the same manner with respect to the other delay circuits.). That is, by virtue of the delay circuit 2, the first-half data and the second half-data of the same symbol are supplied to the butterfly operation device 4 by the same timing to be input thereto simultaneously with each other (the items of each of the first-half data and second-half data being input one by one in order from the leading item). The butterfly operation device 4 performs a radix-2 butterfly operation with respect to corresponding data items of the two groups of input data.

FIG. 12 shows the principle of a radix-2 butterfly operation. In the example of operation shown in FIG. 12, the number N of data items of one symbol is 16.

That is, the butterfly operation device 4 adds the first one of first-half data items represented by numbers 0 to 7, i.e., data item 0, and the first one of second-half data items represented by numbers 8 to 15, i.e., data item 8, in sixteen data items constituting a symbol g and represented by numbers 0 to 15 in FIG. 12. The butterfly operation device 4 also performs subtraction between the data items 0 and 8. T he value obtained by the addition is set as data item 0 in a column p shown in FIG. 12 while the value obtained by the subtraction is set as a data item 8 in column p.

Next, the sum and the difference between the second one of the first-half data items of the symbol g, i.e., data item 1, and the second one of the second-half data items of the symbol g, i.e., data item 9, are calculated. The sum is set as data item 1 in column p while the difference is set as data item 9 in column p. The subsequent data items are processed in the same manner. Thus, sixteen data items represented by numbers 0 to 15 in column p are obtained. The group of eight data items in the first half of column p, represented by numbers 0 to 7, and the group of eight data items in the second half of column p, represented by numbers 8 to 15, are supplied in parallel with each other to the processing circuit forming the subsequent stage, each group of data items being sent in serial order.

In the second-stage processing circuit, eight data items 0 to 7 in the first half of column p, output from the first-stage butterfly operation device 4, are supplied directly to one of the two input terminals of the changing switch 6-1 while eight data items 8 to 15 in the second half are input to the delay circuit 5-1. The data items input to the delay circuit 5-1 are delayed by N/4 (i.e., an amount corresponding to a quarter of the symbol) and then supplied to the other input terminal of the changing switch 6-1.

The changing switch 6-1 executes processing for suitably changing the data items supplied to the two input terminals shown as upper and lower terminals in FIG. 11.

That is, as shown in FIG. 12, the four data items 0 to 3 in column-p data that form the first half of items 0 to 7 supplied through the upper input terminal are supplied to the delay circuit 7-1. Following that the four data items 4 to 7 in column-p data second half of items 0 to 7 are output to the multiplier 8-1 for the twiddle factors. Four column-p data items 8 to 11, which are supplied to the lower input terminal of the changing switch 6-1 when four column-p data items 4 to 7 are supplied to the upper input terminal of the changing switch 6-1, are supplied to the delay circuit 7-1. Four column-p data items 12 to 15, input subsequently, are supplied to the multiplier 8-1 for the twiddle factors.

That is, data items 0 to 3 and 8 to 11 are successively output from the first output terminal of the changing switch 6-1 while data items 4 to 7 and 12 to 15 are successively output from the second output terminal.

The delay circuit 7-1 delays four input column-p data items 0 to 3 by N/4 and supplies these data items to one of the two input terminals of the butterfly operation device 9-1. At this time, four data items 4 to 7 which have undergone multiplication for the twiddle factors in the multiplier 8-1 are supplied to the other input terminal of the butterfly operation device 9-1. That is, by virtue of the delay circuit 7-1, data items 0 to 3 and data items 4 to 7 are supplied to the butterfly operation device 9-1 by the same timing to be input thereto simultaneously with each other.

The butterfly operation device 9-1 calculates the sum and difference between the column-p data items 0 and 4, sets the sum as data item 0 in column q and se ts the difference as data item 4 in column q. The butterfly operation device 9-1 also calculates the sum and difference between the column-p data items 1 and 5, sets the sum as data item 1 in column q and sets the difference as data item 5 in column q. The same processing is repeated to obtain eight column-q data items 0 to 7 from column-p data items 0 to 7.

After delaying four input column-p data items 0 to 3 by N/4, the delay circuit 7-1 delays four subsequently-input data items 8 to 11 by N/4 and supplies these data items to the above-mentioned one input terminal of the butterfly operation device 9-1. At this time, four data items 12 to 15 which have undergone multiplication for the twiddle factors in the multiplier 8-1 are supplied to the other input terminal of the butterfly operation device 9-1. That is, four data items 8 to 11 and four data items 12 to 15 are supplied to the two input terminals of the butterfly operation device 9-1 by the same timing to be input thereto simultaneously with each other.

The butterfly operation device 9-1 calculates the sum and difference between the column-p data items 8 and 12, sets the sum as data item 8 in column q and sets the difference as data item 12 in column q. The butterfly operation device 9-1 also calculates the sum and difference between the column-p data items 9 and 13, sets the sum as data item 9 in column q and sets the difference as data item 13 in column q.

The subsequent column-p data items are processed in the same manner. Thus, eight column-q data items 8 to 15 are obtained from eight column-p data items 8 to 15.

Column-q data items 0 to 7 and 8 to 15 output from the second-stage butterfly operation device 9-1 are input to the third-stage processing circuit in parallel with each other.

Similar processing is subsequently performed in the third-stage and subsequent processing circuits.

Of the data processed by the butterfly operation device 9-$k$ in the processing circuit forming the stage including the delay circuits 5-$k$ and 7-$k$ for delaying data by an amount corresponding to one data item, the data output from the upper output terminal of the butterfly operation device 9-$k$ as shown in FIG. 11 is supplied to the upper input terminal of the change-over switch 11 while the data output from the lower output terminal of the butterfly operation device 9-$k$ is delayed by N/2 by the delay circuit 10A an d then supplied to the lower input terminal of the change-over switch 11.

The change-over switch 11 first selects and outputs data items 0, 2, 4, 6, 8, 10, 12, and 14 in column G shown in FIG. 12, which are supplied to the upper input terminal. The change-over switch 11 next selects and outputs data items 1, 3, 5, 7, 9, 11, 13, and 15 in column G, which are input from the delay circuit 10A. The rearrangement circuit 12 rearranges these data items into a sequence, e.g., 0, 8, 4, 12, 2, 10, 6, 14, 1, 9, 5, 13, 3, 11, 7, 15 (by so-called bit reverse processing mentioned below in the description of an embodiment of the present invention) and outputs this sequence of data items.

The above-described sequence of operation is repeated. Thus, serial data input to the distribution switch 1 is successively processed in a pipeline processing manner through the processing stages by being divided into groups of data items processed in parallel with each other, and the processed data items are again changed into serial data by the change-over switch 11. This serial data is output at the same clock rate as the serial data input to the distribution switch 1.

The distribution switch 1, the changing switch 6-1 to 6-$k$ and the change-over switch 11 in the processing stages are controlled by a predetermined timing by a timing control circuit (not shown)

The number of delay circuits required in this example is 2(N−1).

In the example shown in FIG. 11, the multiplier 8-$i$ for the twiddle factors (multiplier 3) in each stage is inserted between the lower output terminal of the changing switch 6-$i$ (distribution switch 1) and the lower input terminal of the butterfly operation device 9-$i$ (butterfly operation device 4), as shown in FIG. 13. Alternatively, it may be connected to the lower output terminal of the butterfly operation device 9-$i$, as shown in FIG. 14.

Further, the multiplier 8-$i$ for the twiddle factors may alternatively be inserted between the delay circuit 5-$i$ and the lower input terminal of the changing switch 6-$i$. In each case, the same operation result can be obtained as in the case of using the arrangement shown in FIG. 13. However, the multiplying values of multiplication for the twiddle factors are changed according to the inserted position.

FIG. 16 shows an example of radix-4 butterfly operation relating to the radix-2 butterfly operation of the processing system shown in FIG. 11. In this example, a first-stage distribution switch 11 divides data of the each of input symbols into quarters and outputs the divided data items. The first quarter of the data is delayed by N/4 by each of the delay circuits 12A, 12B, and 12C, that is, delayed by 3N/4 in total and then supplied to a first input terminal of a butterfly operation device 14. The second quarter of the data is delayed by N/4 by each of the delay circuits 12D and 12E, that is, delayed by N/2 in total and then input to a multiplier 13A for the twiddle factors. The multiplier 13A multiplies the input data by complex coefficients stored in a memory such as a ROM (not shown) and supplies the result of this multiplication to a second input terminal of the butterfly operation device 14.

The third quarter of the data output from the distribution switch 11 is delayed by N/4 by a delay circuit 12F and then input to a multiplier 13B for the twiddle factors. The multiplier 13B performs multiplication of the input data with respect to the twiddle factors and supplies the result of this multiplication to a third input terminal of the butterfly operation device 14. The fourth quarter of the data output from the distribution switch 11 undergoes multiplication for the twiddle factors performed by a multiplier 13C for the twiddle factors and is then supplied to a fourth input terminal of the butterfly operation device 14.

The butterfly operation device 14 performs butterfly operation of the groups of data input through the four input terminals and successively outputs each of the four parallel groups of data to a second-stage processing circuit.

In the second-stage processing circuit, the data output from a first output terminal of the first-stage butterfly operation device 14 is input directly to a first input terminal of a changing switch 16-1. The data output from a second output terminal of the butterfly operation device 14 is delayed by N/16 by a delay circuit 15F-1 and then supplied to a second input terminal of the changing switch 16-1. The data output from a third output terminal of the butterfly operation device 14 is delayed by N/16 by each of the delay circuits 15D-1 and 15E-1, that is, delayed by N/8 in total and then supplied to a third input terminal of the changing switch 16-1. The data output from a fourth output terminal of the butterfly operation device 14 is delayed by N/16 by each of the delay circuits 15A-1, 15B-1, and 15C-1, that is, delayed by 3N/16 in total and then supplied to a fourth input terminal of the changing switch 16-1.

The changing switch 16-1 suitably selects data items input through the four input terminals and outputs the selected data items through its four output terminals.

The data output from the first output terminal of the changing switch 16-1 is delayed by N/16 by each of the delay circuits 17A-1, 17B-1, and 17C-1, that is, delayed by 3N/16 in total and then supplied to a first input terminal of a butterfly operation device 19-1. The data output from the second output terminal of the changing switch 16-1 is delayed by N/16 by each of the delay circuits 17D-1 and 17E-1, that is, delayed by N/8 in total and then input to a multiplier 18A-1 for the twiddle factors. The multiplier 18A-1 performs multiplication of the input data with respect to the twiddle factors and supplies the result of this multiplication to a second input terminal of the butterfly operation device 19-1.

The data output from the third output terminal of the changing switch 16-1 is delayed by N/16 by a delay circuit 17F-1 and then input to a multiplier 18B-1 for the twiddle factors. The multiplier 18B-1 performs multiplication of the input data with respect to the twiddle factors and supplies the result of this multiplication to a third input terminal of the butterfly operation device 19-1. The data output from the fourth output terminal of the changing switch 16-1 undergoes multiplication for the twiddle factors performed by a multiplier 18C-1 for the twiddle factors and is then supplied to a fourth input terminal of the butterfly operation device 19-1.

Similar processing is performed in each of the subsequent stages to successively process the data. In the example shown in FIG. 11, the delay time of the delay circuits in each stage is ½ of that of the delay circuits in the preceding stage. In contrast, in this example, the delay time of each stage is ¼ of that of the preceding stage.

The data output from each of the first to fourth output terminals of a butterfly operation device 19-$k$ in a stage in which the delay time of delay circuits corresponds to one data item is supplied to the corresponding one of the first to fourth input terminals of a change-over switch 21 directly or after being delayed by N/4 by a delay circuit 20F, delay circuits 20D and 20E or delay circuits 20A to 20C. The change-over switch 21 suitably selects data items input through the first to fourth terminals in parallel with each other and outputs the selected data items as serial data. A rearrangement circuit 22 rearranges the outputs from the change-over switch 11 and outputs rearranged data.

The operation of this processing system will next be described. The distribution switch 11 divides each of a series of data input with respect to unit symbols into four groups and outputs the divided groups of data through the first to fourth output terminals. For example, if one symbol is constituted of 16 data items as shown in FIG. 17, four data items of a symbol g represented by numbers 0 to 3 are output through the first terminal; four data items represented by numbers 4 to 7, through the second output terminal; four data items represented by numbers 8 to 11, through the third output terminal; and four data items represented by numbers 12 to 15, through the fourth output terminal.

Four data items 0 to 3 ahead of the others with respect to time are delayed by a total of 3N/4 by the delay circuits 12A, 12B, and 12C and supplied to the first input terminal of the butterfly operation device 14. Four data items 4 to 7 are delayed by a total of N/2 by the delay circuits 12D and 12E, then undergo multiplication for the twiddle factors in the multiplier 13A for the twiddle factors, and are supplied to the second input terminal of the butterfly operation device 14.

Four data items 8 to 11 are delayed by N/4 by the delay circuit 12F and then input to the multiplier 13B for the twiddle factors. These data items are supplied to the third input terminal of the butterfly operation device 14 after undergoing multiplication for the twiddle factors. Four data items 12 to 15 undergo multiplication for the twiddle factors in the multiplier 13C for the twiddle factors and are thereafter supplied to the fourth input terminal of the butterfly operation device 14. Thus, the groups of four data items are respectively supplied to the four input terminals of the butterfly operation device 14 by the same timing to be input thereto simultaneously with each other, the data items in each group being input in serial order.

The butterfly operation device 14 performs the butterfly operation of data items 0, 4, 8, and 12 respectively input from the four input terminals, as shown in FIG. 17. As the result of this operation, data items 0, 4, 8, and 12 in column p shown in FIG. 17 are set.

Next, the butterfly operation of data items 1, 5, 9, and 13 of symbol g is performed to set data items 1, 5, 9, and 13 in column p.

The subsequent data items of symbol g are processed in the same manner. Thus, sixteen data items in column p are calculated from the sixteen data items of symbol g. These operation results are output to the second-stage professing circuit.

In the second processing circuit, p-column data items 0 to 3 are supplied to the first terminal of the changing switch 16-1, and column-p data items 4 to 7 are delayed by N/16 by the delay circuit 15F-1 and then supplied to the second input terminal. Data items 8 to 11 are delayed by a total of N/8 by the delay circuits 15D-1 and 15E-1 and then supplied to the third input terminal. Data items 12 to 15 are delayed by a total of 3N/16 by the delay circuits 15A-1, 15B-1, and 15C-1 and then supplied to the fourth input terminal.

The changing switch 16-1 first selects column-p data item 0 output from the first output terminal of the butterfly operation device 14 and input through the first input terminal of the changing switch 16-1, and outputs this data item through the first output terminal. Data item 0 output from the first output terminal of the changing switch 16-1 is delayed by 3N/16 by the delay circuits 17A-1, 17B-1, and 17C-1 and then supplied to the first input terminal of the butterfly operation device 19-1.

At the next input time, data items 1 and 4 are respectively supplied to the first input terminal and the second input terminal of the changing switch 16-1. Data item 1 is output through the second output terminal while data 4 is output through the first output terminal.

Similarly, data items 2, 5, and 8 supplied next are output through the third, second and first output terminals, respectively; data items 3, 6, 9, and 12 are output through the fourth, third, second and first output terminals, respectively; data items 7, 10, and 13 are output through the fourth, third and second output terminals, respectively; data items 11 and 14 are output through the fourth and third output terminals, respectively; and data item 15 is output through the fourth output terminal.

Column-p data items 0, 4, 8, and 12 output through the first output terminal are delayed by a total of 3N/16 by the delay circuits 17A-1, 17B-1, and 17C-1, and are then supplied to the first input terminal of the butterfly operation device 19-1.

Column-p data items 1, 5, 9, and 13 output through the second output terminal are delayed by N/8 by the delay circuits 17D-1 and 17E-1, thereafter undergo multiplication for the twiddle factors performed by the multiplier 18A-1 for the twiddle factors, and are then supplied to the second input terminal of the butterfly operation device 19-1.

Column-p data items 2, 6, 10, and 14 output through the third output terminal are delayed by N/16 by the delay circuit 17F-1, thereafter undergo multiplication for the twiddle factors performed by the multiplier 18B-1 for the twiddle factors, and are then supplied to the third input terminal of the butterfly operation device 19-1. Column-p data items 3, 7, 11, and 15 output through the fourth output terminal undergo multiplication for the twiddle factors performed by the multiplier 18C-1 for the twiddle factors, and are supplied to the fourth input terminal of the butterfly operation device 19-1.

As described above, column-p data items 0 to 3 are respectively supplied to the first to fourth input terminals of the butterfly operation device 19-1 by the same timing to be input thereto simultaneously with each other. The butterfly operation device 19-1 performs the butterfly operation on these four data items to form data items 0 to 3 in column G.

Similarly, when data items 4 to 7 are input to the butterfly operation device 19-1, four data items are output from the butterfly operation device 19-1 as data items 4 to 7 in column G. Also, when data items 8 to 11 or 12 to 15 are input, items 8 to 11 or 12 to 15 in column G shown in FIG. 17 are obtained from the first to fourth output terminals of the butterfly operation device 19-1.

If the number of data items of one symbol is sixteen, the operation of the butterfly operation devices is completed by the above-described processing. If the number of data items of one symbol is larger than sixteen, the same processing is performed in one or more subsequent processing circuits.

Of the four column-G data items 0 to 4 with which butterfly operation has been completed, data item 0 is supplied to the first input terminal of the change-over switch 21 without being delayed. Data item 1 is delayed by N/4 by the delay circuit 20F, data item 2 is delayed by N/2 by the delay circuit 20D and 20E and data item 3 is delayed by 3N/4 by the delay circuits 20A, 20B, and 20C before they are respectively supplied to the second to third input terminals of the change-over switch 21.

The change-over switch 21 selects and outputs data items 0, 4, 8, and 12 input through the first input terminal in the first period of N/4 and selects and outputs data items 1, 5, 9, and 13 input through the second input terminal in the next N/4 period. In the subsequent periods, the change-over switch 21 selects and outputs data items 2, 6, 10, and 14 input through the second input terminal and data items 3, 7, 11, and 15 input through the third input terminal.

By repeating this operation, the data items are output in serial form and are rearranged in the order from 0 to 15 in the rearrangement circuit 22.

In the case of the system shown in FIG. 11, in which the radix is 2, the number of delay circuits is 2 (N−1). In the case of the system shown in FIG. 16, in which the radix is 4, the number of delay circuits is 4 (N−1). (If the radix is R, the number of delay circuits is R(N - 1).

In the example shown in FIG. 16, the multipliers 18A-$i$, 18B-$i$, and 18C-$i$ for the twiddle factors are placed between the delay circuit 17E-$i$ and the second input terminal of the butterfly operation device 19-$i$, between the delay circuit 17F-$i$ and the third input terminal of the butterfly operation device 19-$i$ and between the fourth output terminal of the changing switch 16-$i$ and the fourth input terminal of the butterfly operation device 19-$i$, respectively, as shown in FIG. 18. Alternatively, the multipliers 18A-$i$, 18B-$i$, and 18C-$i$ may be connected to the second to fourth output terminals of the butterfly operation device 19-$i$, as shown in FIG. 19, or may be inserted between the delay circuits 15F-$i$, 15E-$i$, and 15C-$i$, and the second to fourth input terminals of the changing switch 16-$i$, as shown in FIG. 20, to obtain the same operation result.

In either example, the position of the multipliers for the twiddle factors is not restricted and there is no limit to the radix of fast Fourier transform. Further, there is no restriction on setting the amount of delay. In each of the above-described examples, series of data are input to or output from each stage in parallel with each other.

If data is processed in such a simple pipeline processing manner, the number of delay circuits necessary in processing circuits forming a plurality of stages, as represented by R(N-1), becomes larger as the radix R is increased.

SUMMARY OF THE INVENTION

In view of these circumstances, an object of the present invention is to provide an arithmetic unit and a method enabling Fourier transform using a smaller number of delay circuits and a processing system having a small-scale circuit configuration.

To achieve this object, according to one aspect of the present invention, there is provided a Fourier transform arithmetic unit comprising a plurality of processing stages for performing fast Fourier transform by pipeline processing, each of the plurality of processing stages having division means for dividing input data corresponding to one symbol into a plurality of groups of data, firsts delay means for delaying, by a predetermined amount of time, at least the group of data most advanced with respect to time in the plurality of divided groups of data, first feedback means for supplying the group of data output from the first delay means to the first delay means a certain number of times until a time when the group of data most retarded with respect to time is output from the division means, first operation means for performing a butterfly operation of the plurality of groups of data to obtain a plurality of operation results, the groups of data being input to the first operation means simultaneously with each other, and multiplexing means for multiplexing the plurality of operation results from the first operation means with respect to time to obtain a multiplexed output.

According to another aspect of the present invention, there is provided a Fourier transform arithmetic unit comprising a plurality of processing stages for performing fast Fourier transform by pipeline processing, each of the plurality of processing stages having timing control means for performing timing control by dividing input data corresponding to one symbol into a plurality of groups of data and for delaying at least one of the plurality of groups of data as desired so that the groups of data are output simultaneously with each other, first operation means for performing a butterfly operation of the plurality of groups of data to obtain a plurality of operation results, the groups of data being input to the first operation means from the timing control means simultaneously with each other, multiplexing means for multiplexing the plurality of operation results from the first operation means in a time division multiplexing manner to obtain a multiplexed output, and second operation means for performing an operation of the twiddle factors with respect to the output from the multiplexing means.

According to still another aspect of the present invention, there is provided a Fourier transform arithmetic unit comprising a plurality of processing stages for performing fast Fourier transform by pipeline processing, each of the plurality of processing stages having first delay means in which delay devices for delaying input data by a predetermined amount of time are connected in series, first operation means supplied with data items output from an input terminal and an output terminal of the delay means and points of connection between the plurality of delay devices, the first operation means performing a butterfly operation using the data items to output a plurality of operation results, and multiplexing means for multiplexing the plurality of operation results from the first operation means with respect to time to obtain a multiplexed output.

According to a further aspect of the present invention, there is provided a Fourier transform operation method of performing fast Fourier transform by pipeline processing using a plurality of processing stages, the method comprising the steps of, in each of the plurality of processing stages, dividing input data corresponding to one symbol into a plurality of groups of data, performing timing control so that the plurality of divided groups of data are output simultaneously with each other, obtaining a plurality of operation results by performing a butterfly operation of the groups of data output simultaneously with each other, multiplexing the plurality of operation results in a time division multiplexing manner to obtain a time-division-multiplexed output, and performing an operation for the twiddle factors with respect to the time-division-multiplexed output.

BRIEF DESCRIPTION OF THE DRAWINGS

FIG. 10 is a diagram for explaining bit reverse processing;

DESCRIPTION OF THE PREFERRED EMBODIMENTS

Figure 1:
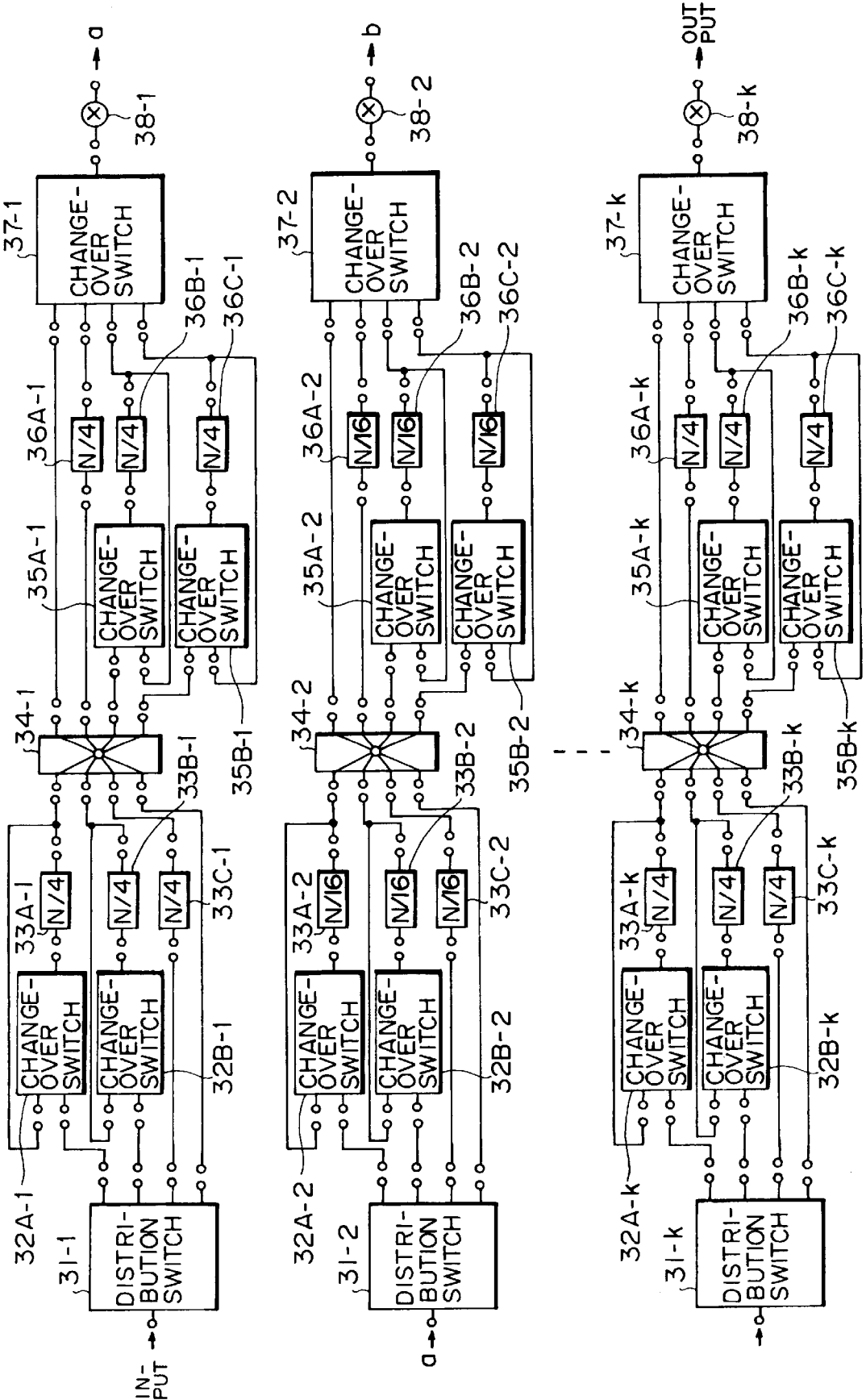
FIG. 1 is a block diagram showing the configuration of a Fourier transform arithmetic unit in accordance with a first embodiment of the present invention.

FIG. 1 shows the configuration of an embodiment of a Fourier transform arithmetic unit in accordance with the present invention in which radix-4 operations are performed and which is formed of processing circuits forming k stages.

Data is first input to an initial-stage distribution switch 31-1. The first quarter of data of one symbol first input (preceding with respect to time) is output through a first output terminal of the distribution switch 31-1, which is shown in FIG. 1 as the uppermost one of four input terminals of the distribution switch 31-1. The second quarter of the one-symbol data next input is output through the second output terminal of the distribution switch 31-1, which is the second from the top. The third quarter of the one-symbol data next input is output through the third output terminal of the distribution switch 31-1, which is the third from the top. The last fourth quarter of the one-symbol data is output through the fourth output terminal of the distribution switch 31-1, which is the lowermost one.

The data output from the first output terminal is supplied to one of two input terminals of a change-over switch 32A-1. An output from a delay circuit 33A-1 is supplied to the other input terminal of the change-over switch 32A-1. The change-over switch 32A-1 selects one of the two inputs to its input terminals and supplies the selected data to the delay circuit 33A-l. The delay circuit 33A-1 delays the input data by N/4 and outputs the delayed data to a first input terminal of a butterfly operation device 34-1, which is the uppermost one of four input terminals of the butterfly operation device 34-1.

The data output from the second output terminal of the distribution switch 31-1 is supplied to one of two input terminals of a change-over switch 32B-1. An output from a delay circuit 33B-1 is supplied to the other input terminal of the change-over switch 32B-l. The change-over switch 32B-1 selects one of the two inputs to its input terminals and outputs the selected data to the delay circuit 33B-1. The delay circuit 33B-1 delays the input data by N/4 and outputs the delayed data to the second input terminal of the butterfly operation device 34-1, which is the second from the top.

The data output from the third output terminal of the distribution switch 31-1 is delayed by N/4 by a delay circuit 33C-1 and then supplied to the third input terminal of the butterfly operation device 34-1, which is the third from the top. The data output from the fourth output terminal of the distribution switch 31-1 is supplied to the fourth input terminal of the butterfly operation device 34-1, which is the lowermost one.

The butterfly operation device 34-1 performs a butterfly operation of the data input through the four input terminals and outputs four operation results through its first to fourth output terminals.

The data output from the first output terminal of the butterfly operation device 34-1 at the uppermost position is supplied to a first input terminal of a change-over switch 37-1, which is the uppermost one of four input terminals of the change-over switch 37-1. The data output from the second output terminal of the butterfly operation device 34-1 at the second position from the top is delayed by N/4 by a delay circuit 36A-1 and then supplied to the second input terminal of the change-over switch 37-1, which is the second from the top.

The data output from the third output terminal of the butterfly operation device 34-1 at the third position from the top is supplied to one of two input terminals of a change-over switch 35A-1. An output from a delay circuit 36B-1 is supplied to the other input terminal of the change-over switch 35A-l. The change-over switch 35A-1 selects one of the two inputs to its input terminals and outputs the selected data to delay circuit 36B-1. The delay circuit 36B-1 delays the input data by N/4 and supplies the delayed data to the third input terminal of the change-over switch 37-1, which is the third from the top.

The data output from the fourth output terminal of the butterfly operation device 34-1 at the lowermost position is supplied to one of two input terminals of a change-over switch 35B-1. An output from a delay circuit 36C-1 is supplied to the other input terminal of the change-over switch 35B-1. The change-over switch 35B-1 selects one of the two inputs to its input terminals and outputs the selected data to delay circuit 36C-1. The delay circuit 36C-1 delays the input data by N/4 and supplies the delayed data to the fourth input terminal of the change-over switch 37-1, which is the lowermost one.

The change-over switch 37-1 suitably selects the items of data input through the four input terminals so as to convert the input parallel data into serial data. The change-over switch 37-1 supplies the converted serial data to a multiplier 38-1 for the twiddle factors. The multiplier 38-1 performs multiplication for the twiddle factors by multiplying the input data by complex coefficients stored in a memory such as a ROM (not shown) and inputs the result of this multiplication to the processing circuit forming the subsequent processing stage.

The initial stage is thus arranged. The processing circuits forming the second and other subsequent stages are also arranged in the same manner. However, the delay time of delay circuits of the processing circuit forming each stage is reduced to ¼ of that in the processing circuit forming the preceding stage. The delay time of the final stage is set to 1 in terms of the number of data items (a delay time corresponding to one data item).

The operation of this arithmetic unit will next be described. The distribution switch 31-1 inputs the first quarter of input data corresponding to one symbol to the change-over switch 32A-1. The change-over switch 32A-1 selects this input and supplies this data to the delay circuit 33A-1. The delay circuit 33A-1 delays the input data by N/4 and outputs the delayed data. The change-over switch 32A-1 is changed to the upper input position as seen in FIG. 1 after a time elapse corresponding to N/4 from the moment at which the data from the distribution switch 31-1 is input. The change-over switch 32A-1 then fetches the output from the delay circuit 33A-1 and again supplies this data to the delay circuit 33A-1. When the data again delayed by N/4 by the delay circuit 33A-1 (the data delayed by a total of N/2) is output from the delay circuit 33A-1, it is again input to the delay circuit 33A-1 through the change-over switch 32A-1 to be further delayed by N/4, that is, delayed by a total of 3N/4 before it is output.

When another group of data is output from the second output terminal of the distribution switch 31-1 with a time lag corresponding to N/4 from the time of output from the first output terminal, it is output to the delay circuit 33B-1 by the change-over switch 32B-1. The delay circuit 33B-1 delays this data by N/4 and outputs the delayed data. When the data is output from the delay circuit 33B-1, the change-over switch 32B-1 is changed to the upper input position as seen in FIG. 1. The data output from the delay circuit 33B-1 is thereby input to the delay circuit 33B-1 again. The delay circuit 33B-1 further delays the input data by N/4 and outputs the data which has been delayed by a total of N/2.

Still another group of data is output from the third output terminal of the distribution switch 31-1 with a time lag corresponding to N/2 from the moment at which the data is output from the first output terminal of the distribution switch 31-1. This data is delayed by N/4 by the delay circuit 33C-1 and then output.

A further group of data is output from the fourth output terminal of the distribution switch 31-1 with a time lag corresponding to 3N/4 from the moment at which the data is output from the first output terminal of the distribution switch 31-1. This data is input directly to the fourth input terminal of the butterfly operation device 34-1. At this time, the groups of data respectively delayed by 3N/4, N/2 and N/4 are simultaneously supplied to the first to third input terminals of the butterfly operation device 34-1. That is, the quarters of the data divided by the distribution witch 31-1 are supplied to the first to fourth input terminals of the butterfly operation device 34-1 simultaneously with each other, items of each quarter of the data being input in serial order.

The butterfly operation device 34-1 performs the butterfly operation of the data input through its first to fourth input terminals and outputs four results of this operation through the first to fourth output terminals. That is, if, for example, the data of one symbol consists of sixteen data items 0 to 15, four column-p data items 0, 4, 8, and 12 obtained by butterfly operation of four column-g data items 0, 4, 8, and 12 are first output from the first to fourth output terminals of the butterfly operation device 34-1, as described above with reference to FIG. 17. At the next output time, data items 1, 5, 9, and 13 are output, data items 2, 6, 10, and 14 are thereafter output, and data items 3, 7, 11, and 15 are finally output.

Data items 0 to 3 output from the first output terminal of the butterfly operation device 34-1 are input directly to the first input terminal of the change-over switch 37-1. The change-over switch 37-1 first selects these four data items and outputs these to the multiplier 38-1 for the twiddle factors. The multiplier 38-1 performs multiplication of this data with respect to the twiddle factors and outputs the result of this multiplication to the subsequent stage.

Data items 4 to 7 output from the second output terminal of the butterfly operation device 34-1 are delayed by N/4 by the delay circuit 36A-1 and then supplied to the second terminal of the change-over switch 37-1. The change-over switch 37-1 selects these four data items input through the second input terminal and outputs these data items at the next selection and output time after selecting and outputting the four data items from the first input terminal. Thus, data items 4 to 7 are output to the subsequent stage after undergoing multiplication for the twiddle factors by the multiplier 38-1.

When data items 8 to 11 are output from the third output terminal of the butterfly operation device 34-1, they are fetched by the change-over switch 35A-1 and delayed by N/4 by the delay circuit 36B-1. When these four data items are output from the delay circuit 36B-1, they are again fetched by the change-over switch 35A-1 to be again input to the delay circuit 36B-1. Four data items 8 to 11 delayed by a total of N/2 are thereby output. The change-over switch 37-1 selects these four data items input through the third input terminal and outputs these data items at the next selection and output time after selecting and outputting the four data items from the second input terminal. Consequently, four data items 8 to 11 are output to the subsequent stage after undergoing multiplication for the twiddle factors by the multiplier 38-1.

When data items 12 to 15 are output from the fourth output terminal of the butterfly operation device 34-1, the change-over switch 35B-1 fetches these data items and outputs these to the delay circuit 36C-1. The delay circuit 36C-1 delays these four data items by N/4 and outputs the delayed data items. The change-over switch 35B-1 again supplies the delay circuit 36C-1 with the data output from the delay circuit 36C-1. When the data further delayed by N/4 (delayed by a total of N/2) is output from the delay circuit 36C-1, the change-over switch 35B-1 again fetches this data and inputs this data to the delay circuit 36C-1. Consequently, four data items 12 to 15 delayed by a total of 3N/4 are output from the delay circuit 36C-1.

The change-over switch 37-1 selects and outputs four data items 12 to 15 input through the fourth input terminal after selecting and outputting the data input through the third input terminal. These data items are output to the subsequent stage after undergoing multiplication for the twiddle factors by the multiplier 38-1.

Thus, sixteen data items 0 to 15 are output to the subsequent stage after their form has been changed into the serial form, followed by similar processing in the subsequent stages.

As described above, this embodiment is arranged in such a manner that in the processing circuit forming each stage, each group of data divided by the distribution switch is passed through the same delay circuit a certain number of times to effect timing adjustment, so that the number of delay circuits is 2(N−1). This number 2(N−1) is constant even if the radix is increased to 8, 16, . . . . That is, if the radix is increased, the effect of reducing the number of delay circuits becomes higher in comparison with the conventional arrangement in which in accordance with the expression R(N−1) the number of delay circuits becomes larger as the radix is increased.

Figure 2:
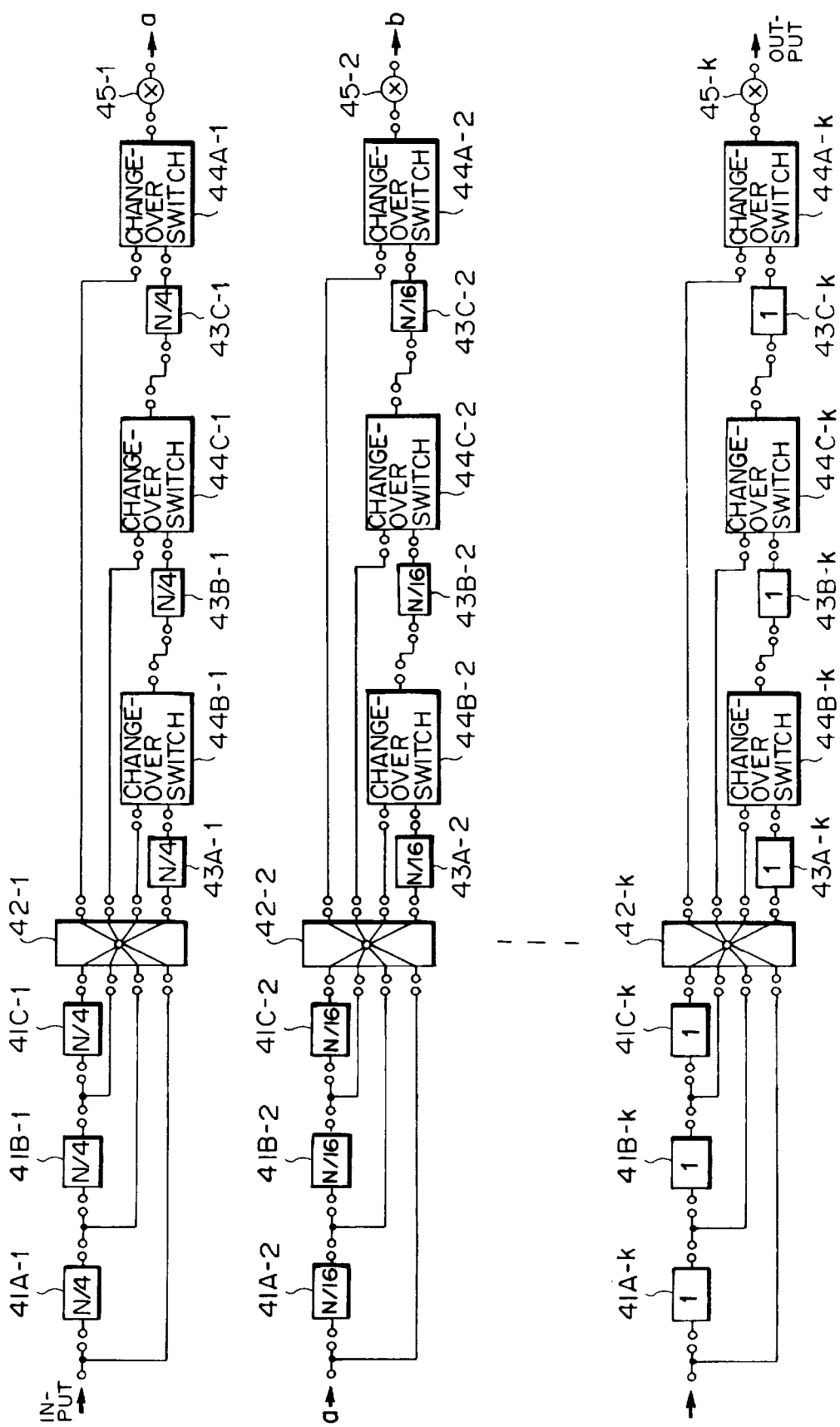
FIG. 2 is a block diagram showing the configuration of a Fourier transform arithmetic unit in accordance with a second embodiment of the present invention.

FIG. 2 shows a second embodiment of the present invention. In this embodiment, a Fourier transform arithmetic unit is formed of k-stage processing circuits, and data input to the initial-stage processing circuit is successively delayed by N/4 by each of delay circuits 41A-1, 41B-1, and 41C-1. An output from the delay circuit 41C-1 is supplied to a first output terminal of the butterfly operation device 42-1. An output from the delay circuit 41B-1 is supplied to the second input terminal of the butterfly operation device 42-1 and an output from the delay circuit 41A-1 is supplied to the fourth input terminal of the butterfly operation device 42-1.

The butterfly operation device 42-1 performs the butterfly operation of four data items input through the first to fourth input terminals and outputs four results of this operation through its first to fourth output terminals. The data output through the first output terminal is supplied to one of two input terminals of a change-over switch 44A-1. The data output through the second output terminal is supplied to one of two input terminals of a change-over switch 44C-1. The data output through the third output terminal is supplied to one of two input terminals of a change-over switch 44B-1.

The data output through the fourth output terminal of the butterfly operation device 42-1 is delayed by N/4 by a delay circuit 43A-1 and then supplied to the other input terminal of the change-over switch 44B-1. The change-over switch 44B-1 selects one of the two inputs to its input terminals and outputs the selected data to a delay circuit 43B-1. The delay circuit 43B-1 delays the input data by N/4 and supplies the delayed data to the other input terminal of the change-over switch 44C-1. The change-over switch 44C-1 selects one of the two inputs to its input terminals and outputs the selected data to a delay circuit 43C-1. The delay circuit 43C-1 delays the input data by N/4 and supplies the delayed data to the other input terminal of the change-over switch 44A-1.

The change-over switch 44A-1 selects one of the two inputs to its input terminals and outputs the selected data to a multiplier 45-1 for the twiddle factors. An output from the multiplier 45-1 is output to the subsequent processing circuit.

The second-stage and other processing circuits are arranged in the same manner as the first-stage processing circuit. However, the delay time of delay circuits in the processing circuit forming each stage is ¼ of that of the preceding stage.

The operation of this arithmetic unit will next be described. If, for example, data corresponding to one symbol and consisting of sixteen data items is input as in the above-described cases, this data is successively delayed by N/4 by each of the delay circuits 41A-1, 41B-1, and 41C-1 and output. Accordingly, at the time when the first one of the four data items in the first quarter of the input data is output from the delay circuit 41C-1, the first one of the four data items in the second quarter of the input data is output from the delay circuit 41B-1. Also, the first one of the four data items in the third quarter of the input data is output from the delay circuit 41A-1 while the first one of the four data items in the last quarter of the input data is supplied to the input terminal of the delay circuit 41A-1. Consequently, the first ones of the four groups of data quartered from the data corresponding to one symbol are simultaneously supplied to the first to fourth input terminals of the butterfly operation device 42-1. The butterfly operation device 42-1 performs the butterfly operation of these four data items and outputs four operation results through the first to fourth output terminals.

Butterfly operation is performed in the same manner with respect to the second to fourth data items of each divided group of data input subsequently.

Figure 17:
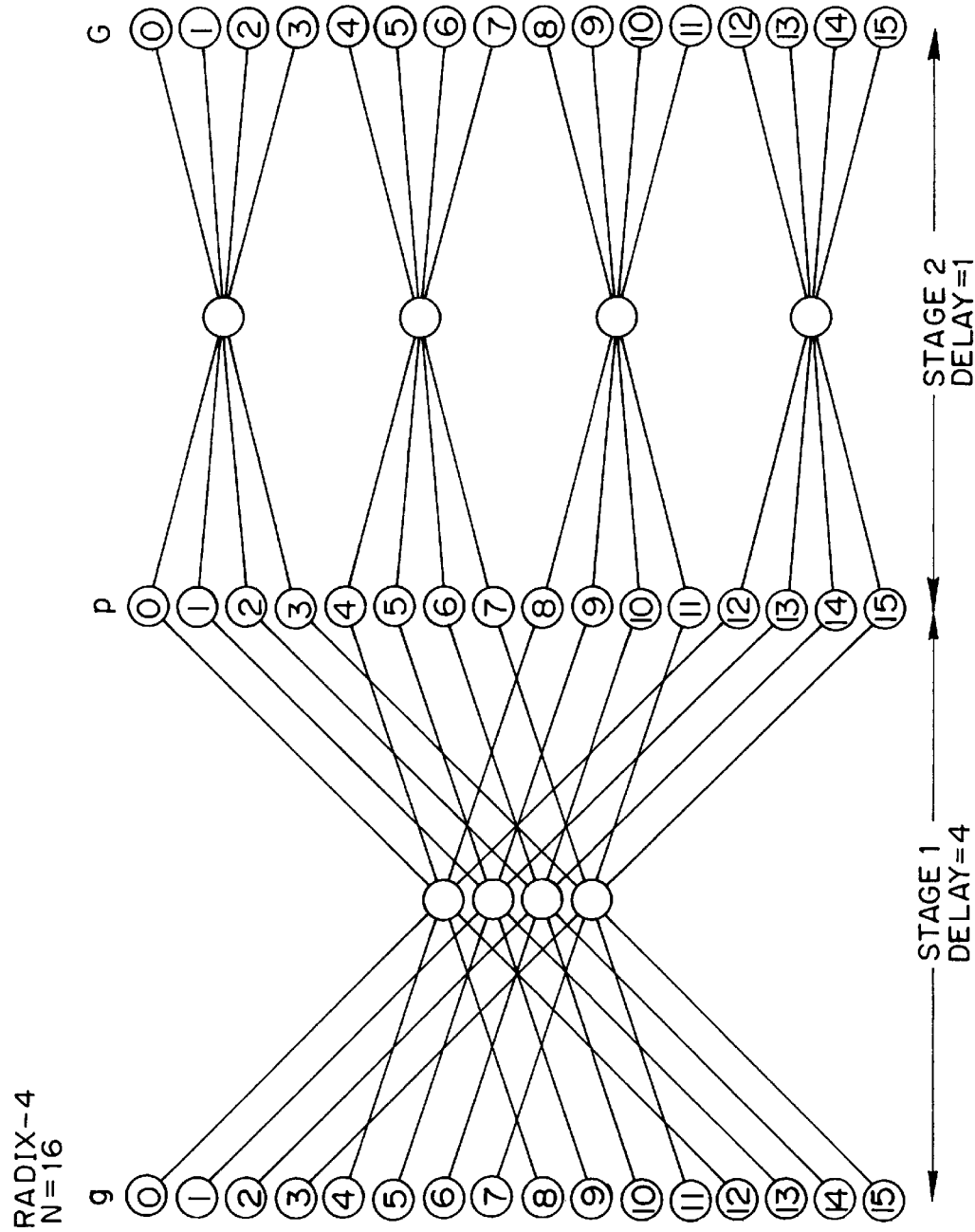
FIG. 17 is a diagram for explaining an algorithm for fast Fourier transform in a case where the radix is 4.
Figure 18:
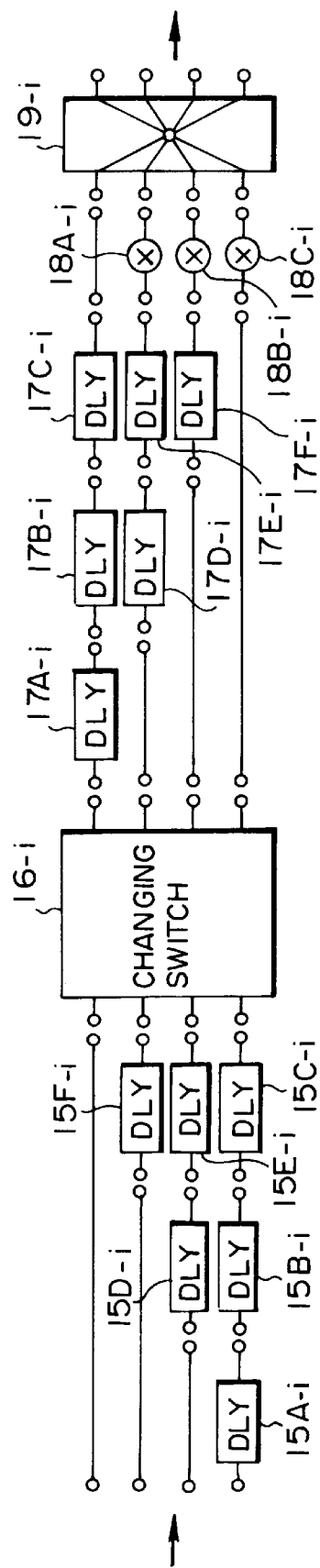
FIG. 18 is a diagram showing the inserted position of the multiplier for the twiddle factors in the example shown in FIG. 16.
Figure 19:
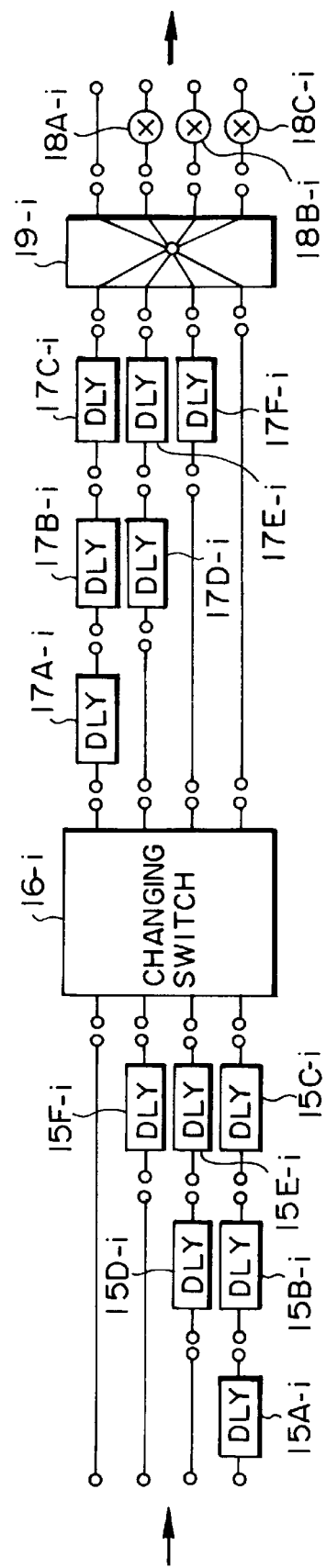
FIG. 19 is a diagram showing another example of the inserted position of the multiplier for the twiddle factors.
Figure 20:
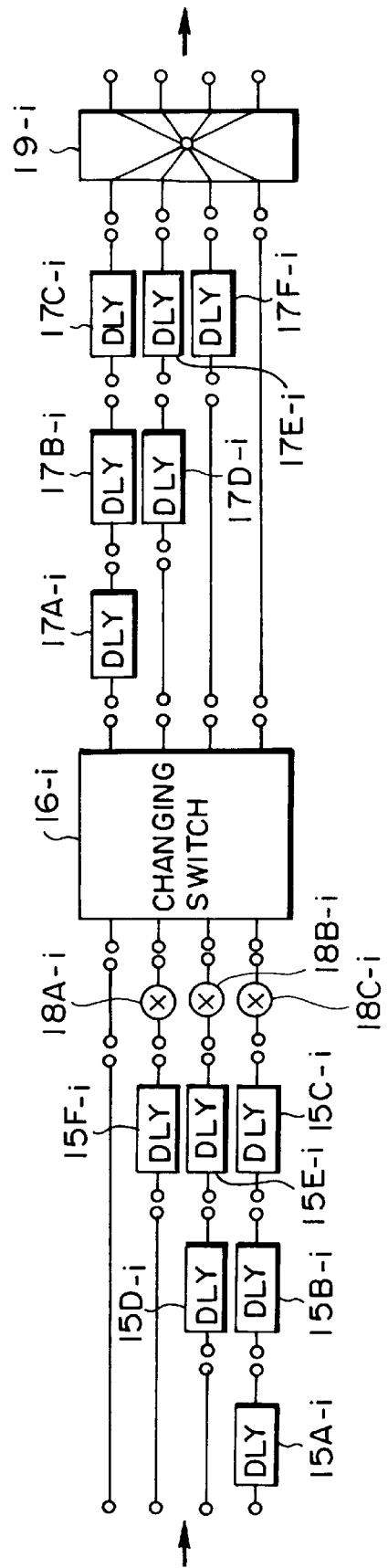
FIG. 20 is a diagram showing still another example of the inserted position of the multiplier for the twiddle factors.

As a result, data items corresponding to column-p data items 0 to 3 shown in FIG. 17 are output from the first output terminal of the butterfly operation device 42-1; data items corresponding to column-p data items 4 to 7 from the second output terminal; data items corresponding to column-p data items 8 to 11 from the third output terminal; and data items corresponding to column-p data items 12 to 15 from the fourth output terminal.

The change-over switches 44A-1, 44C-1, and 44B-1 are initially set to the upper change-over positions as seen in FIG. 2. Accordingly, four data items 0 to 3 output from the first output terminal of the butterfly operation device 42-1 are input to the multiplier 45-1 for the twiddle factors through the change-over switch 44A-1. Having undergone multiplication for the twiddle factors, these data items are output to the subsequent processing circuit.

Also, four data items 4 to 7 output from the second output terminal of the butterfly operation device 42-1 are input to the delay circuit 43C-1 through the change-over switch 44C-1 to be delayed by N/4. Accordingly, to the change-over switch 44A-1, four data items 4 to 7 are successively input from the delay circuit 43C-1 at the next selection time after the change-over switch 44A-1 has selected and output the data output from the first output terminal of the butterfly operation device 42-1. At this time, the change-over switch 44A-1 is changed to the lower change-over position as seen in FIG. 2 to select and output these four data items, thereby supplying these data items to the multiplier 45-1 for multiplication for the twiddle factors.

Four data items 8 to 11 output from the third output terminal of the butterfly operation device 42-1 are input to the delay circuit 43B-1 through the change-over switch 44B-1 to be delayed by N/4. To the change-over switch 44C-1, four data items 8 to 11 are input from the delay circuit 43B-1 immediately after the change-over switch 44C-1 has selected and output four data items 4 to 7 output from the second output terminal of the butterfly operation device 42-1. Then, the change-over switch 44C-1 is changed to the lower change-over position as seen in FIG. 2 to output these data items 8 to 11 to the delay circuit 43C-1. Four data items 8 to 11 are further delayed by N/4 by the delay circuit 43C-1 and input to the multiplier 45-1 for the twiddle factors.

The data output from the fourth output terminal of the butterfly operation device 42-1 is delayed by N/4 by the delay circuit 43A-1 and then input to the change-over switch 44B-1. The change-over switch 44B-1 is changed to the lower change-over position as seen in FIG. 2 immediately after it has selected data items 8 to 11 output from the third output terminal of the butterfly operation device 42-1. The change-over switch 44B-1 thereby selects data items 12 to 15 output from the delay circuit 43A-1 and outputs these data items to the delay circuit 43B-1. This data is delayed by N/4 by the delay circuit 43B-1 and then input to the delay circuit 43C-1 through the change-over switch 44C-1 to be further delayed by N/4, that is, delayed by 3N/4 in total. This data is input to the multiplier 45-1 for the twiddle factors through the change-over switch 44A-1.

Thus, data items 0 to 15 are successively input in serial order to the multiplier 45-1 for the twiddle factors. After undergoing multiplication for the twiddle factors, the data is output to the processing circuit forming the subsequent stage.

Similar processing is performed in the subsequent stage.

Also in this embodiment, the number of delay circuits is 2(N−1). In the embodiment shown in FIG. 2, the radix is 4. However, even if the radix is increased, the number of delay circuits is not increased; it is 2(N−1).

Figure 3:
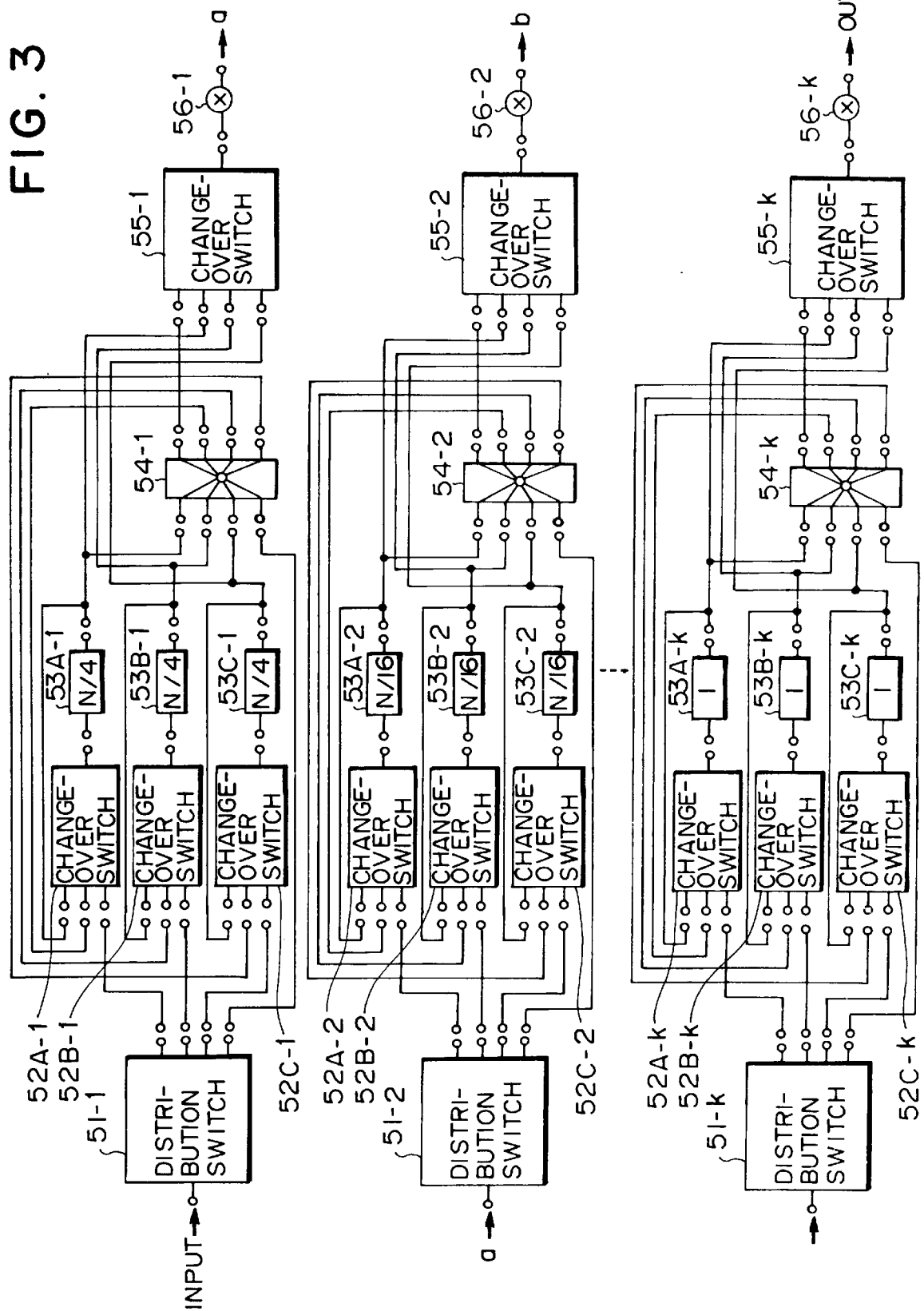
FIG. 3 is a block diagram showing the configuration of a Fourier transform arithmetic unit in accordance with a third embodiment of the present invention.

FIG. 3 shows a third embodiment of the present invention. This embodiment is arranged in such a manner that delay circuits having functions corresponding to those of the delay circuits connected to the input terminals of the butterfly operation device 34-1 also have functions of the delay circuits connected to the output terminals of the butterfly operation device 34-1.

In this embodiment, data of one symbol is divided into four groups of data items by a distribution switch 51-1 in an initial stage. The first group of data preceding with respect to time is supplied to a third input terminal of a change-over switch 52A-1, the second group of data is supplied to a third input terminal of a change-over switch 52B-1, and the third group of data is supplied to a third input terminal of a change-over switch 52C-1. The fourth group of data is supplied to a fourth input terminal of a butterfly operation device 54-1.

Outputs from delay circuits 53A-1, 53B-1, and 53C-1 are supplied to first to third input terminals of the butterfly operation device 54-1.

An output from the delay circuit 53A-1 is supplied to a first input terminal of the change-over switch 52A-1. An output from a second output terminal of the butterfly operation device 54-1 is supplied to a second input terminal of the change-over switch 52A-1. The change-over switch 52A-1 selects one of signals supplied to its first to third input terminals and outputs the selected signal to the delay circuit 53A-1.

An output from the delay circuit 53B-1 is supplied to a first input terminal of the change-over switch 52B-1. An output from a third output terminal of the butterfly operation device 54-1 is supplied to a second input terminal of the change-over switch 52B-1. The change-over switch 52B-1 selects one of signals supplied to its first to third input terminals and outputs the selected signal to the delay circuit 53B-1.

An output from the delay circuit 53C-1 is supplied to a first input terminal of the change-over switch 52C-1. An output from a fourth output terminal of the butterfly operation device 54-1 is supplied to a second input terminal of the change-over switch 52C-1. The change-over switch 52C-1 selects one of signals supplied to its first to third input terminals and outputs the selected signal to the delay circuit 53C-1.

The output from the delay circuit 53A-1 is supplied to a second input terminal of a change-over switch 55-1, the output from the delay circuit 53B-1 is supplied to a third input terminal of the change-over switch 55-1, and the output from the delay circuit 53C-1 is supplied to a fourth input terminal of the change-over switch 55-1. An output from a first output terminal of the butterfly operation device 54-1 is supplied to a first input terminal of the change-over switch 55-1. The change-over switch 55-1 selects one of signals supplied to its first to fourth input terminals and outputs the selected signal to a multiplier 56-1 for the twiddle factors. The multiplier 56-1 performs multiplication of the input signal with respect to the twiddle factors and outputs the result of the multiplication to a processing circuit forming a subsequent stage.

The second-stage and other processing circuits forming subsequent stages are arranged in the same manner as the first-stage processing circuit. However, the delay time of the delay circuits in the second stage is reduced to ¼ from the delay time in the initial stage, i.e., N/4, and the delay time in each of the other subsequent stages is reduced to ¼ of that in the preceding stage.

The operation of this embodiment will next be described. The distribution switch 51-1 divides an input symbol into quarters, and outputs first data of the first quarter to the delay circuit 53A-1 through the change-over switch 52A-1. The delay circuit 53A-1 delays the input data by N/4 and outputs the delayed data. The data delayed by the delay circuit 53A-1 is again input to the delay circuit 53A-1 through the change-over switch 52A-1 to be further delayed by N/4. This data is further fed back one more time by the change-over switch 52A-1 to be further delayed by N/4. This data, i.e., the data delayed by a total of 3N/4, is input to the butterfly operation device 54-1 by being supplied to the first input terminal of this device.

The data output from the second output terminal of the distribution switch 51-1 is input to the delay circuit 53B-1 through the change-over switch 52B-1 to be delayed by N/4. This delayed data is again input to the delay circuit 53B-1 through the change-over switch-52B-1 to be further delayed by N/4, that is, delayed by N/2 in total. The data is thereafter input to the butterfly operation device 54-1 by being supplied to the second input terminal of this device.

The third group of data output from the third output terminal of the distribution switch 51-1 is input to the delay circuit 53C-1 through the change-over switch 52C-1 to be delayed by N/4. This delayed data is input to the butterfly operation device 54-1 by being supplied to the third input terminal of this device 54-1. The fourth group of data output from the fourth output terminal of the distribution switch 51-1 is input directly to the fourth input terminal of the butterfly operation device 54-1.

Thus, the four groups of data divided by the distribution switch 51-1 are supplied to the first to fourth input terminals of the butterfly operation device 54-1 simultaneously with each other, the data items in each group being input one after another. The butterfly operation device 54-1 performs the butterfly operation of these groups of data and outputs four operation results through the first to fourth output terminals. The above processing is the same as the processing in the arithmetic unit shown in FIG. 1, in which data is input to the butterfly operation device 54-1 and the desired operation is performed.

Data items 0 to 3 output from the first output terminal of the butterfly operation device 54-1 are input to the multiplier 56-1 for the twiddle factors via the first input terminal of the change-over switch 55-1 to undergo multiplication for the twiddle factors. The result of the multiplication is output to the subsequent processing circuit.

Data items 4 to 7 output from the second output terminal of the butterfly operation device 54-1 are input to the delay circuit 53A-1 via the second input terminal of the change-over switch 52A-1 to be delayed by N/4. These data items are thereafter input to the multiplier 56-1 for the twiddle factors via the second input terminal of the change-over witch 55-1.

Data items 8 to 11 output from the third output terminal of the butterfly operation device 54-1 are input to the delay circuit 53B-1 via the second input terminal of the change-over switch 52B-1 to be delayed by N/4. These data items are again input to the delay circuit 53B-1 through the change-over switch 52B-1 to be delayed by N/4, that is, delayed by N/2 in total, and thereafter supplied to the third input terminal of the change-over switch 55-1.

The data output from the fourth output terminal of the butterfly operation device 54-1 is input to the delay circuit 53C-1 via the second input terminal of the change-over switch 52C-1 to be delayed by N/4. This delayed data is again supplied to the delay circuit 53C-1 through the change-over switch 52C-1 to be delayed by N/4. This delayed data is fed back one more time to the delay circuit 53C-1 through the change-over switch 53C-1. The data thereby delayed by a total of 3N/4 is supplied to the fourth input terminal of the change-over switch 55-1.

Thus, the groups of data output from the second to fourth output terminals of the-butterfly operation device 54-1 while each being shifted by N/4 relative to the preceding one are supplied to the second to fourth input terminals of the change-over switch 55-1 to be successively selected. The selected data is input to the multiplier 56-1 for the twiddle factors. The data is output to the subsequent processing circuit after undergoing multiplication for the twiddle factors.

Similar processing is performed in the processing circuit forming each of the subsequent stages. In this embodiment, the number of necessary delay circuits is (N−1) irrespective of the radix R.

Figure 4:
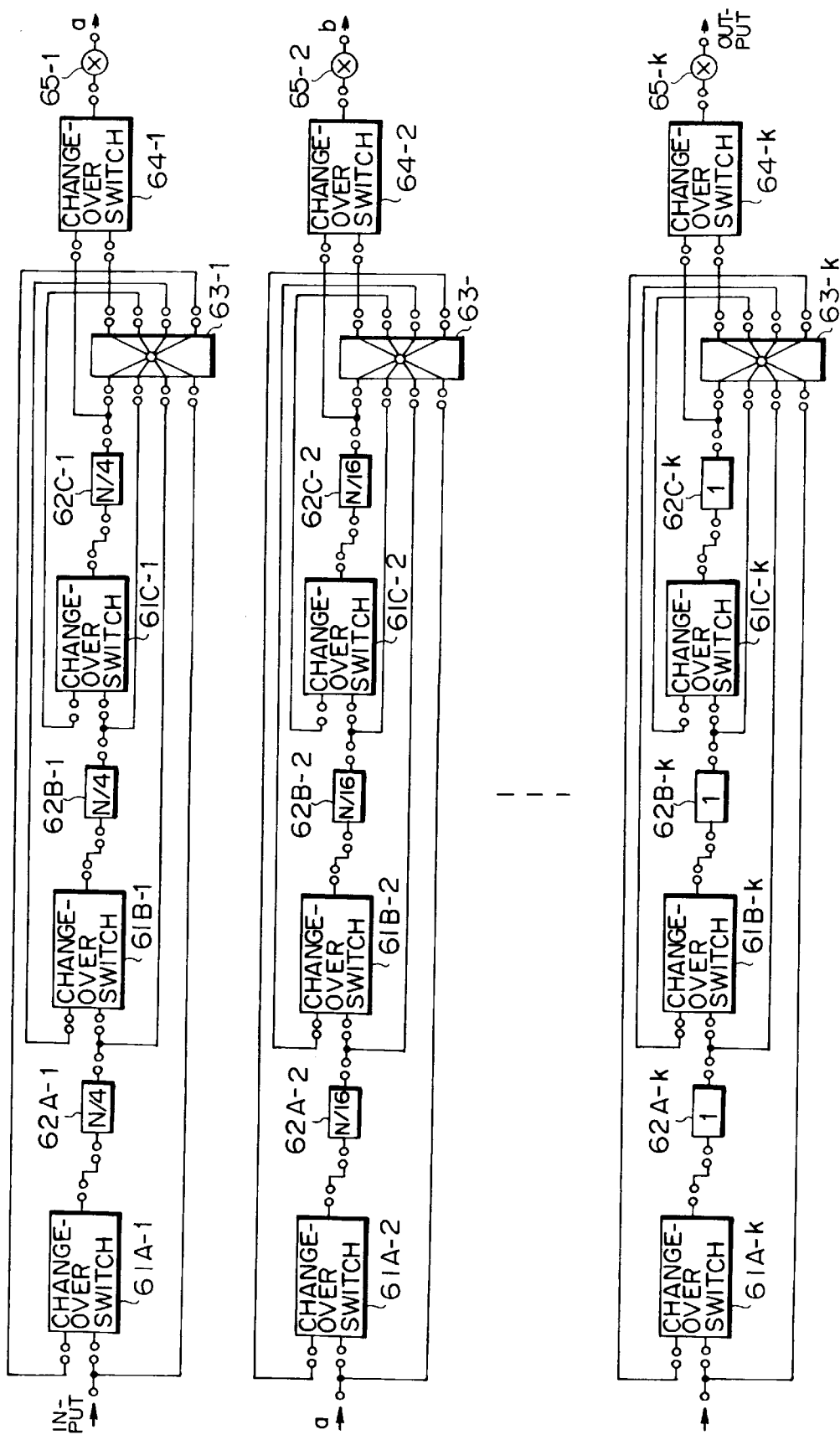
FIG. 4 is a block diagram showing the configuration of a Fourier transform arithmetic unit in accordance with a fourth embodiment of the present invention.

FIG. 4 shows a fourth embodiment of the present invention. This embodiment is arranged in such a manner that delay circuits having functions corresponding to those of the delay circuits 41A-1 to 41-Cl connected to the input terminals of the butterfly operation device 41-1 shown in FIG. 2 also have functions corresponding to those of the delay circuits 43A-1 to 43C-1 connected to the output terminals of the butterfly operation device 42-1, thereby further reducing the number of delay circuits.

That is, in this embodiment, a Fourier transform arithmetic unit is formed of k-stage processing circuits. Data is supplied to one of two input terminals of a change-over switch 61A-1 in the initial stage. An output from a fourth output terminal of a butterfly operation device 63-1 is supplied to the other input terminal of the change-over switch 61A-1. The change-over switch 61A-1 selects one of the two inputs to its input terminals and outputs the selected data to a delay circuit 62A-1. The delay circuit 62A-1 delays the input data by N/4 and supplies the delayed data to one of two input terminals of a change-over switch 61B-1. An output from a third output terminal of the butterfly operation device 63-1 is supplied to the other input terminal of the change-over switch 61B-1.

The change-over switch 61B-1 selects one of the two inputs to its input terminals and outputs the selected data to a delay circuit 62B-1. The delay circuit 62B-1 delays the input data by N/4 and supplies the delayed data to one of two input terminals of a change-over switch 61C-1. An output from a second output terminal of the butterfly operation device 63-1 is supplied to the other input terminal of the change-over switch 61C-1.

The change-over switch 61C-1 selects one of the two inputs to its input terminals and outputs the selected data to a delay circuit 62C-1. The delay circuit 62C-1 delays the input data by N/4 and supplies the data to one of two input terminals of a change-over switch 64-1 and to a first input terminal of the butterfly operation device 63-1.

The butterfly operation device 63-1 is supplied with the output from the delay circuit 62B-1 through its second input terminal and with the output from the delay circuit 62A-1 through its third input terminal of the butterfly operation device 63-1. The data input to the arithmetic unit is supplied directly to a fourth input terminal of the butterfly operation device 63-1.

An output from a first output terminal of the butterfly operation device 63-1 is supplied to the other input terminal of the change-over switch 64-1. The change-over switch 64-1 selects one of the two inputs to its input terminals and outputs the selected data to a multiplier 65-1 for the twiddle factors. The multiplier 65-1 performs multiplication of the input data with respect to the twiddle factors and outputs the result of this multiplication to the processing circuit forming the subsequent stage.

The first-stage processing circuit is thus arranged. The second-stage and other subsequent processing circuits are arranged in the same manner as the first-stage processing circuit. However, the delay time of delay circuits in each stage is set to ¼ of that in the preceding stage.

The operation of this embodiment will next be described. The change-over switches 61A-1, 61B-1, and 61C-1 are initially set at the lower change-over position as seen in FIG. 4. Accordingly, if, for example, sixteen data items corresponding to one symbol are input, these data items are supplied to the delay circuits 62A-1, 62B-1, and 62C-1 through the change-over switches 61A-1, 61B-1, and 61C-1 to be successively delayed by N/4.

Consequently, when the delay circuit 62C-1 outputs the leading one of the four data items supplied as the first quarter of the input data preceding with respect to time, the delay circuit 62B-1 outputs the leading data item in the second quarter, and the delay circuit 62A-1 outputs the leading data item in the third quarter. At this time, the leading data item in the last quarter is input the change-over switch 61A-1 through the input terminal first mentioned. Thus, the leading data items of the groups of data are supplied to the first to fourth input terminals of the butterfly operation device 64-1 simultaneously with each other. Subsequently, the second, third, and fourth data items of the groups of data are successively input simultaneously with each other.

The butterfly operation device 63-1 performs the butterfly operation of the four data items input through its first to fourth input terminals and outputs the resulting four data items through its first to fourth output terminals.

The four data items output from the first output terminal of the butterfly operation device 63-1, which correspond to column-p data items 0 to 3 shown in FIG. 17, are input to the multiplier 65-1 for the twiddle factors through the change-over switch 64-1, undergo multiplication for the twiddle factors, and are thereafter supplied to the subsequent processing circuit.

Data items 4 to 7 output from the second output terminal of the butterfly operation device 63-1 are input to the delay circuit 62C-1 through the change-over switch 61C, delayed by N/4 and then output. Accordingly, four data items 4 to 7 are output from the delay circuit 62C-1 at the next output time after the completion of processing for selecting and outputting four data items 0 to 4 from the first output terminal of the butterfly operation device 63-1 by the change-over switch 64-1. The change-over switch 64-1 fetches these four data items and outputs these to the multiplier 65-1 for the twiddle factors.

Four data items 8 to 11 output from the third output terminal of the butterfly operation device 63-1 are input to the delay circuit 62B-1 through the change-over switch 61B and delayed by N/4. These data items are then input to the delay circuit 62C-1 through the change-over switch 61C-1 to be further delayed by N/4. That is, the delay circuit 62C-1 outputs four data items 8 to 11 successively after outputting four data items 4 to 7. The change-over switch 64-1 selects these data items data items and outputs these to the multiplier 65-1 for the twiddle factors.

Four data items output from the fourth output terminals of the butterfly operation device 63-1 are input to the delay circuit 62A-1 through the change-over switch 61A-1 to be delayed by N/4. These data items are then input to the delay circuit 62B-1 through the change-over switch 61B-1 to be delayed by N/4. Further, these data items are input to the delay circuit 62C-1 through the change-over switch 61C-1 to be delayed by N/4. Accordingly, the delay circuit 62C-1 outputs four data items 12 to 15 successively after outputting four data items 8 to 11. The four data items are input to the multiplier 65-1 for the twiddle factors through the change-over switch 64-1. After performing multiplication of the input data with respect to the twiddle factors, the multiplier 65-1 outputs the data to the subsequent processing circuit.

Similar processing is performed in the second-stage and other subsequent processing circuits.

Also in this embodiment, the number of delay circuits is (N−1) irrespective of the radix R.

Figure 5:
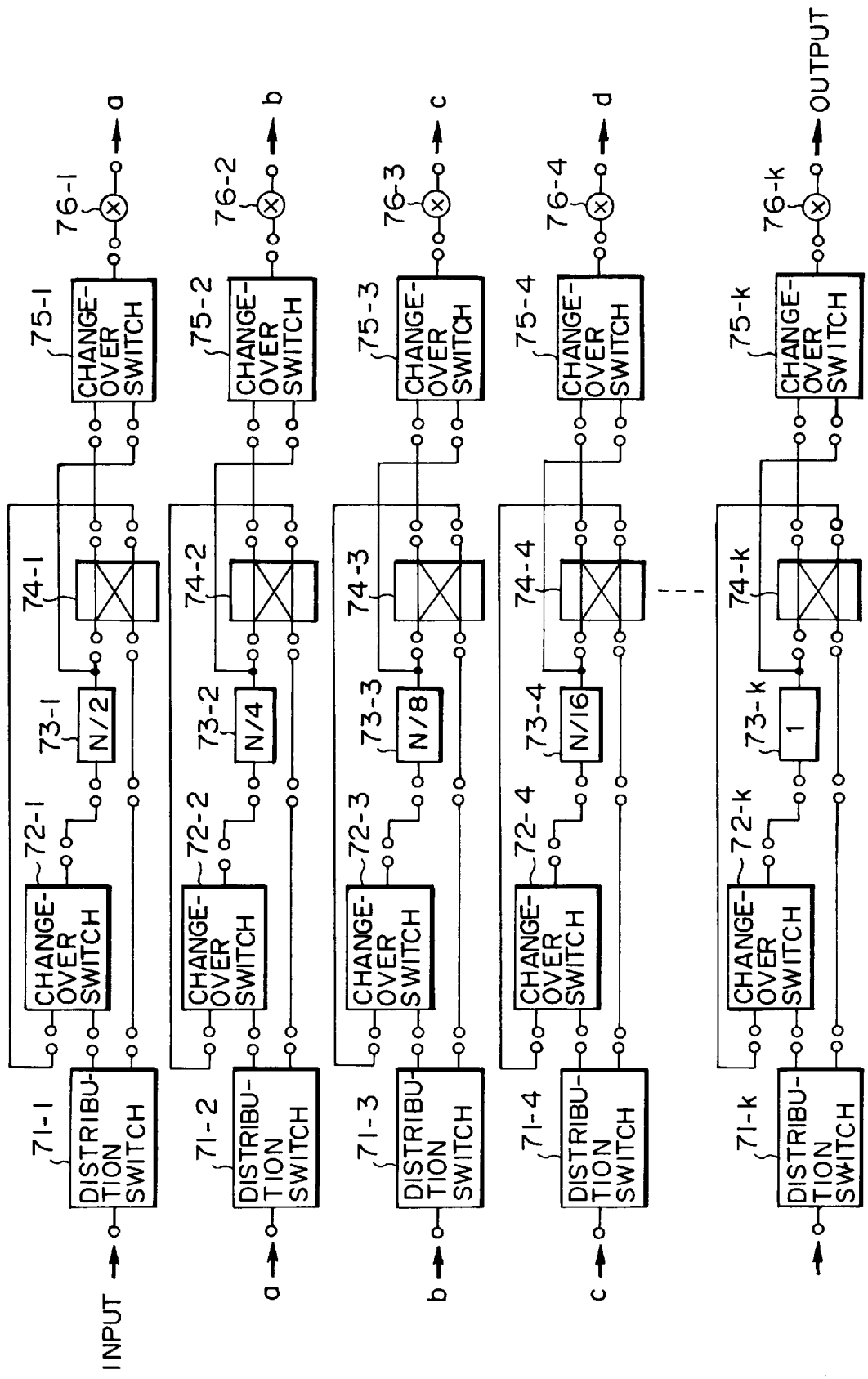
FIG. 5 is a block diagram showing the configuration of a Fourier transform arithmetic unit in accordance with a fifth of the present invention.

FIG. 5 shows a fifth embodiment of the present invention. This embodiment is arranged in such a manner that a delay circuit for delaying data to be input to a butterfly operation device and a delay circuit for delaying data output from the butterfly operation device are combined into one common delay circuit. (This embodiment can be regarded as an embodiment of radix-2 processing relating to the embodiment shown in FIG. 3 (radix-4 embodiment.) Also in this embodiment, a Fourier transform arithmetic unit is formed of processing circuits forming k stages.

That is, the first half of input data separated by a distribution switch 71-1 is supplied to a delay circuit 73-1 through a change-over switch 72-1 to be delayed by N/2. This data is then supplied to a first input terminal of a butterfly operation device 74-1. On the other hand, the second half of input data separated by the distribution switch 71-1 is supplied directly to a second input terminal of the butterfly operation device 74-1.

Data output from a second output terminal of the butterfly operation device 74-1 is again supplied to the delay circuit 73-1 through the change-over switch 72-1. Data output from a first output terminal of the butterfly operation device 74-1 is supplied to a first input terminal of a change-over switch 75-1. To a second input terminal of the change-over switch 75-1, data output from the delay circuit 73-1 is supplied. The change-over switch 75-1 selects one of the two groups of data input to its two input terminals and supplies the selected data to a multiplier 76-1 for the twiddle factors. The multiplier 76-1 performs multiplication of the input data with respect to the twiddle factors and outputs the resulting data to the processing circuit forming the subsequent stage.

The second-stage and other subsequent processing circuits have the same configuration as the first-stage processing circuit. However, the delay time of the delay circuits in each stage is ½ of that in the preceding stage.

Figure 6:
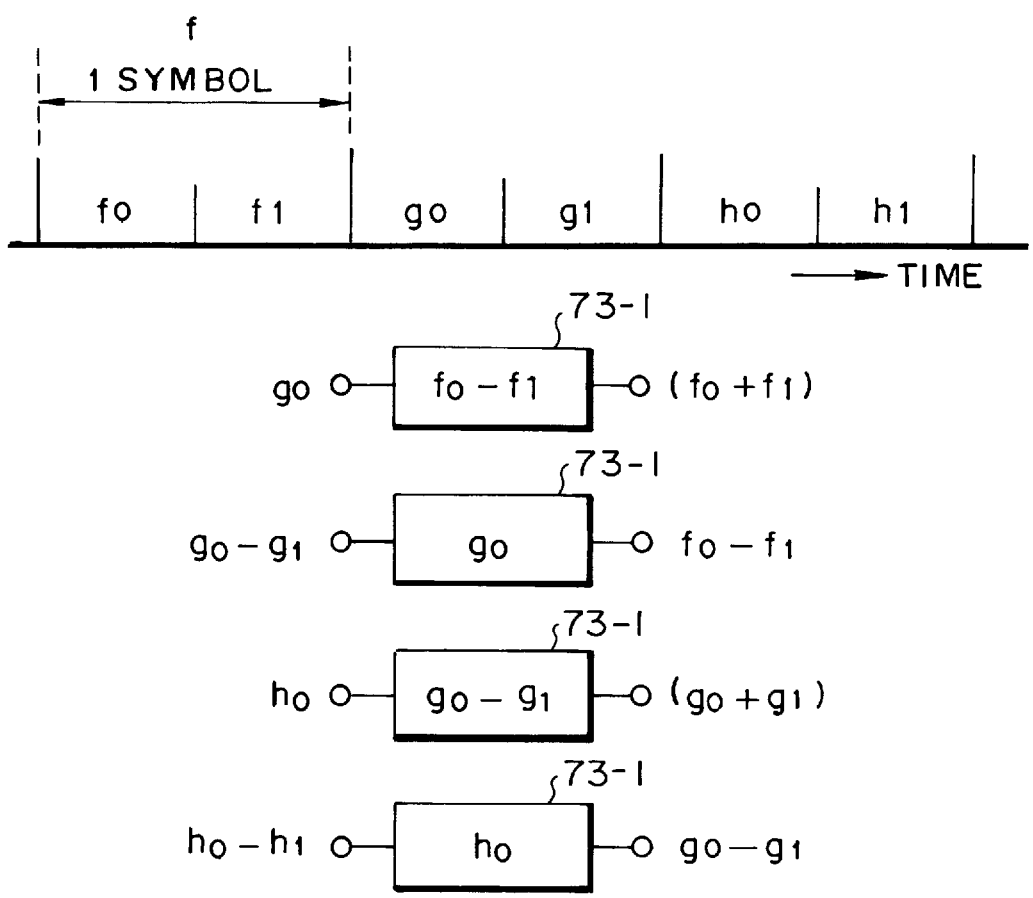
FIG. 6 is a diagram of the operation of the arithmetic unit shown in FIG. 5.

The operation of this arithmetic unit will next be described with reference to FIG. 6. When data of a symbol f input to the distribution switch 71-1, first half $f_0$ of this data is input to the delay circuit 73-1 through the change-over switch 72B-1 to be delayed by N/2. This data is then input to the first input terminal of the butterfly operation device 74-1. Accordingly, when first-half data fo data is input to the first input terminal of the butterfly operation device 74-1, second-half data $f_1$ is supplied to the second input terminal of the butterfly operation device 74-1 from the second output terminal of the distribution switch 71-1. The butterfly operation device 74-1 performs the butterfly operation with respect to each item of first-half data $f_0$ and second-half data $f_1$, and successively output data of operation result $f_0+f_1$ through the first output terminal and data of other operation result $f_0-f_1$ through the second output terminal. Data $f_0+f_1$ output from the first output terminal is input to the multiplier 76-1 for the twiddle factors through the change-over switch 75-1. This data is output to the subsequent processing circuit after undergoing multiplication for the twiddle factors.

On the other hand, data $f_0-f_1$ output from the second output terminal of the butterfly operation device 74-1 is input to the delay circuit 73-1 through the change-over switch 72-1 to be delayed by N/2. Accordingly, when outputting data $f_0+f_1$ from the first output terminal of the butterfly operation device 74-1 is completed, data $f_0-f_1$ is successively output from the delay circuit 73-1. The change-over switch 75-1 selects data $f_0-f_1$ successively output from the delay circuit 73-1 and outputs this data to the multiplier 76-1 for the twiddle factors. The multiplier 76-1 performs multiplication of each item of input data $f_0-f_1$ with respect to the twiddle factor and outputs the resulting data to the subsequent processing circuit.

The same processing is executed with respect to data of symbols g, h, . . . input subsequently to symbol f data. Consequently, as shown in FIG. 6, data $f_0-f_1$ is accumulated in the delay circuit 73-1 when outputting data $f_0+f_1$ from the butterfly operation device 74-1 is completed, and first-half data $g_0$ of the next symbol g is successively accumulated when data $f_0-f_1$ is read out.

When data $g_0$ is being accumulated, data $f_0-f_1$ previously accumulated in the delay circuit 73-1 is read out to be supplied to the first input terminal of the change-over switch 75-1. When accumulation of data go is completed, data $g_0-g_1$ is next supplied to the delay circuit 73-1.

Similar processing is performed in the second-stage and other subsequent processing circuits.

The number of delay circuits in this embodiment is (N−1).

Figure 7:
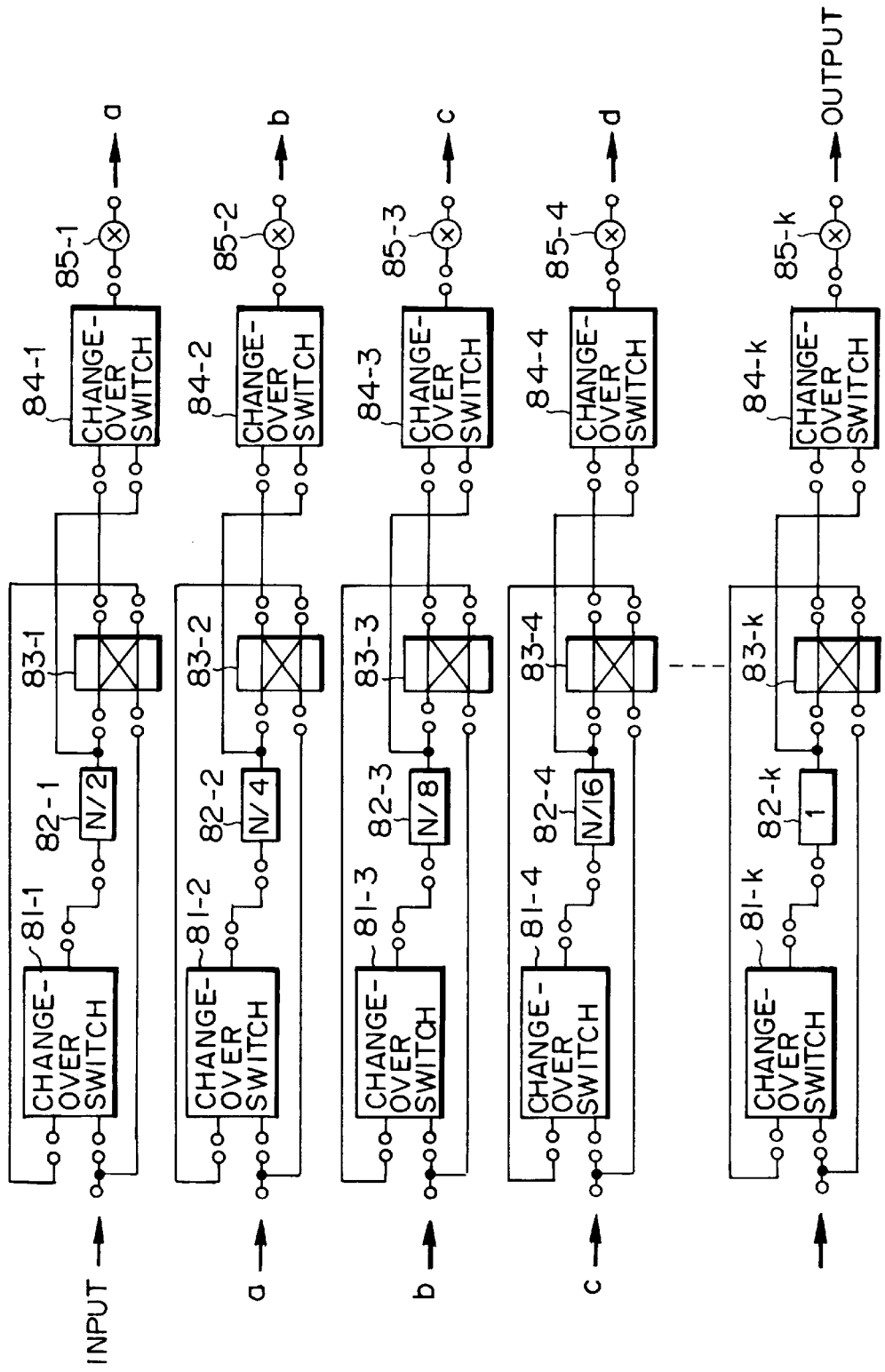
FIG. 7 is a block diagram showing the configuration of a Fourier transform arithmetic unit in accordance with a sixth embodiment of the present invention.

FIG. 7 shows a sixth embodiment of the present invention as a radix-2 embodiment relating to the radix-4 embodiment shown in FIG. 4. The circuit configuration of this embodiment is similar to that shown in FIG. 4. However, only one delay circuit 82-i is provided in the processing circuit forming each stage. The delay time of the delay circuit 82-1 in the initial-stage processing circuit is set to N/2, and the delay time of the delay circuit 82-i in each stage is ½ of that in the preceding stage.

The operation of this embodiment will next be described. A change-over switch 81-1 is initially set to the lower change-over position as seen in FIG. 7. Accordingly, when data corresponding to one symbol and formed of sixteen data items corresponding to column-g data items shown in FIG. 12, for example, is input, it is supplied to the delay circuit 82-1 through the change-over switch 81-1 to be delayed by N/2.

Accordingly, when the delay circuit 82-1 outputs the leading one of eight first-half data items preceding with respect to time, the leading one of the subsequent second-half data items is input to the input terminals of the change-over switch 81-1 corresponding to the lower change-over position. Consequently, the leading data items of the two groups of data are input to first and second input terminals of a butterfly operation device 83-1 simultaneously with each other.

The butterfly operation device 83-1 performs the butterfly operation with respect to the groups of eight data items supplied to its first and second input terminals and outputs two groups of data (operation results) through its first and second output terminals.

Figure 12:
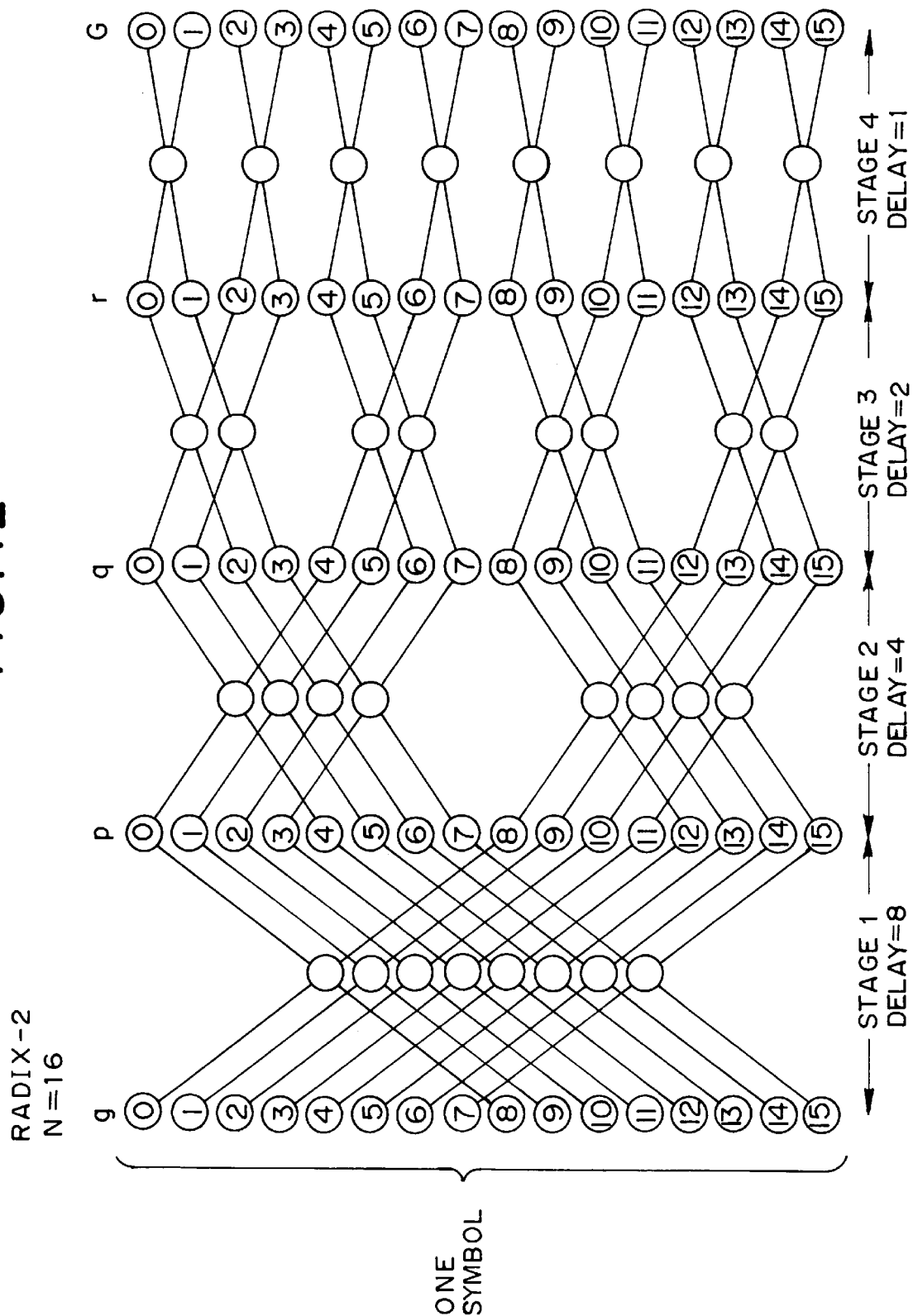
FIG. 12 is a diagram for explaining an algorithm for radix-2 fast Fourier transform.
Figure 13:
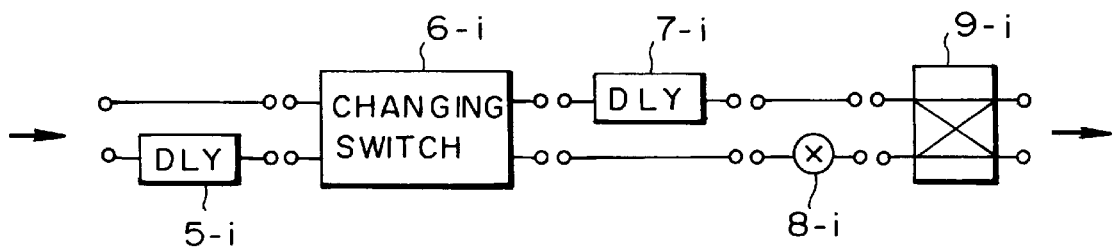
FIG. 13 is a diagram showing the inserted position of the multiplier for the twiddle factors in the example shown in FIG. 11.
Figure 14:
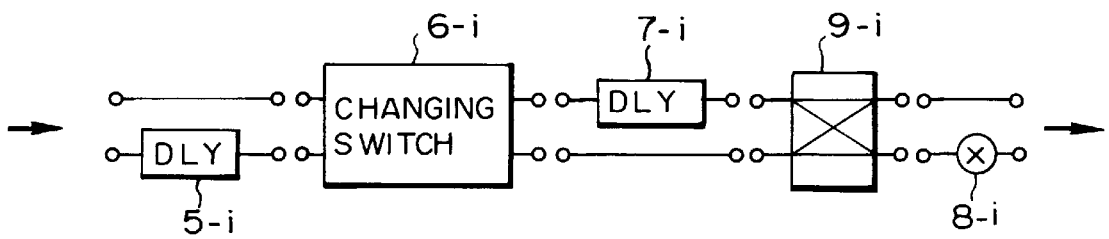
FIG. 14 is a diagram showing another example of the inserted position of the multiplier for the twiddle factors.
Figure 15:
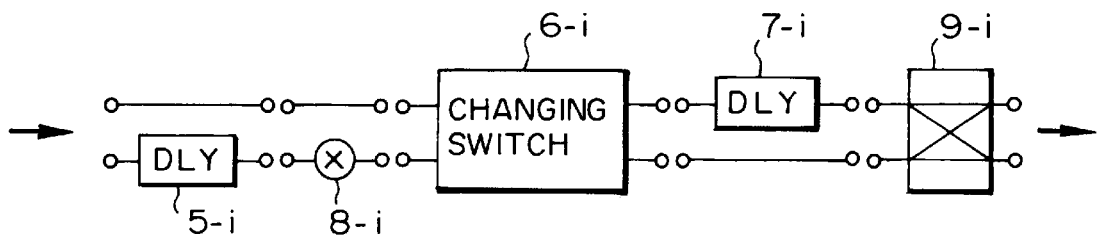
FIG. 15 is a diagram showing still another example of the inserted position of the multiplier for the twiddle factors.

The eight data items output from the first output terminal of the butterfly operation device 83-1, which correspond to column-p data items 0 to 7 shown in FIG. 12, are input to a multiplier 85-1 for the twiddle factors through a change-over switch 84-1. These data items are supplied to the subsequent processing circuit after undergoing multiplication for the twiddle factors.

Eight data items 8 to 15 output from the second output terminal of the butterfly operation device 83-1 are input to the delay circuit 82-1 through the change-over switch 84-1 to be delayed by N/2. These eight data items are input to the multiplier 85-1 for the twiddle factors through the change-over switch 84-1. The multiplier 85-1 outputs the input data items after successively processing these data items by multiplication for the twiddle factors.

Similar processing is performed in the second-stage and other subsequent processing circuits.

The embodiment shown in FIG. 7 has an advantage of simplifying the configuration by eliminating the need for the switch 71-$i$ shown in FIG. 5.

The above-described embodiments are arranged to reduce the number of delay circuits. However, if only a reduction in the number of multipliers for twiddle factors will suffice, an arrangement such as that shown in FIG. 8 is possible.

Figure 8:
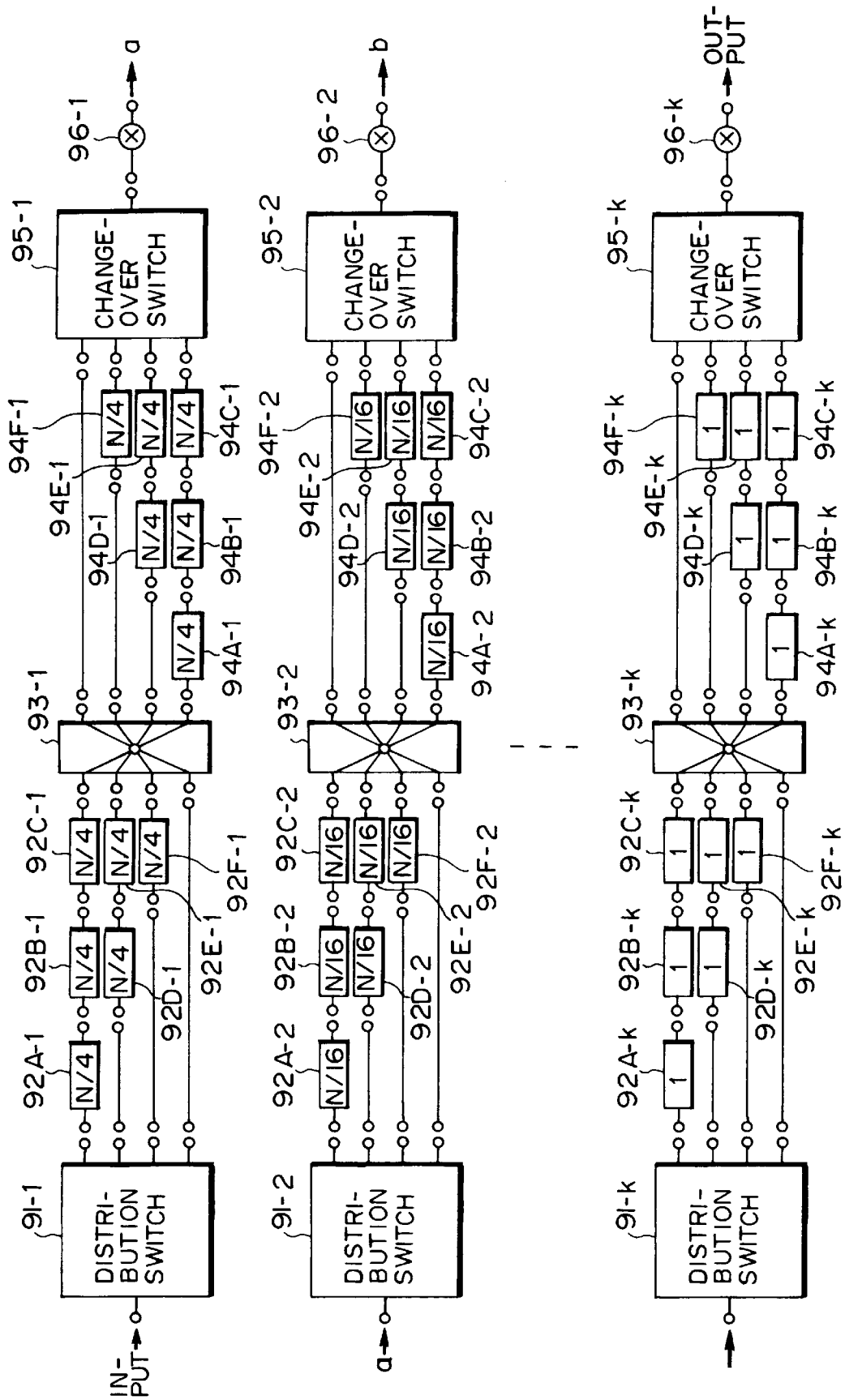
FIG. 8 is a block diagram showing the configuration of a Fourier transform arithmetic unit in accordance with a seventh embodiment of the present invention.
Figure 16:
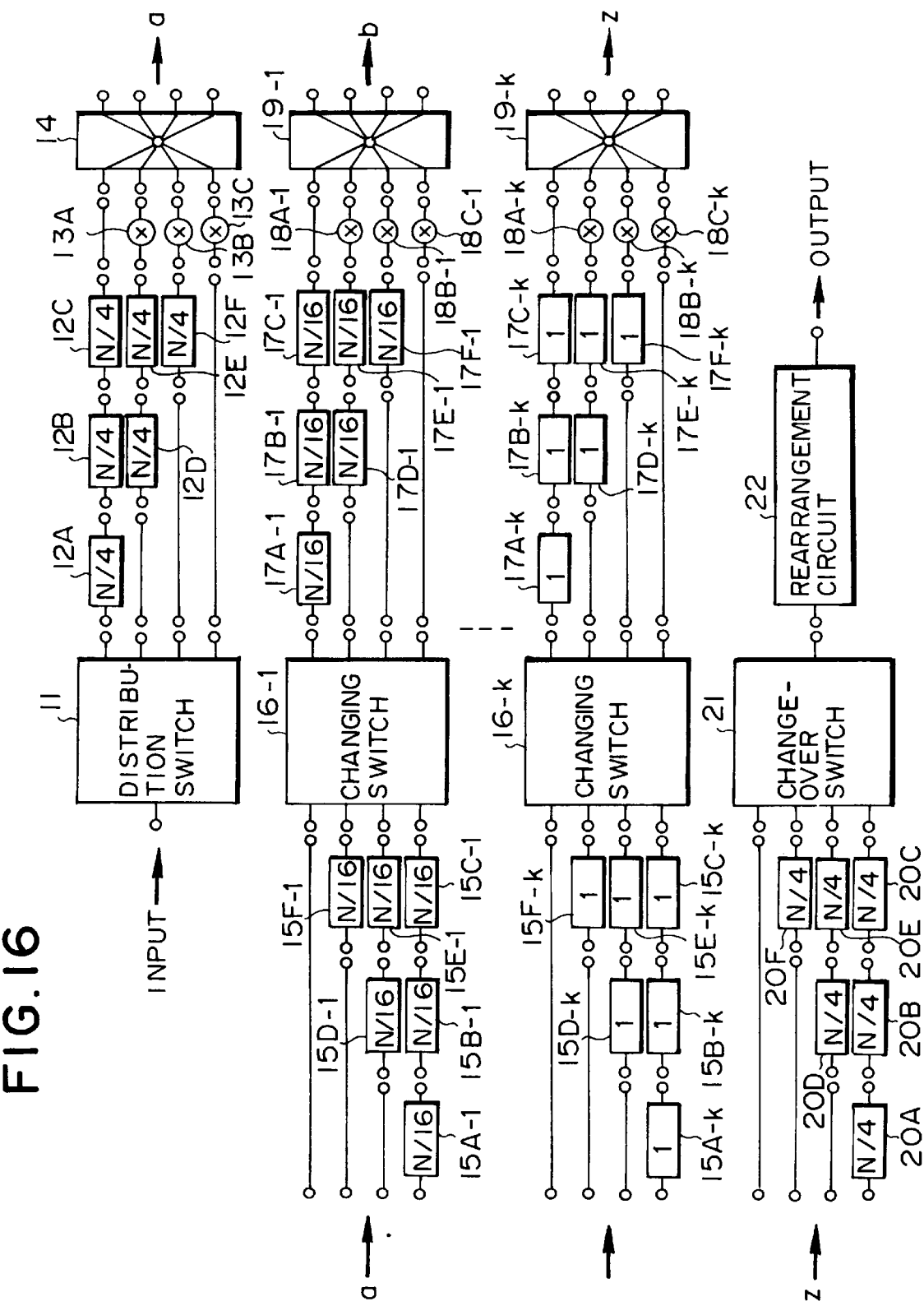
FIG. 16 is a block diagram showing the configuration of another example of the Fourier transform arithmetic unit.

That is, as is apparent from comparison between FIGS. 8 and 16, while in the example shown in FIG. 16 three multipliers for the twiddle factors are provided in the processing circuit forming each stage, one multiplier, i.e., one of multipliers 96-1 to 96-$k$ for the twiddle factors, is provided in the processing circuit forming each stage in the embodiment shown in FIG. 8. In this embodiment, each of the multipliers 96-1 to 96-$k$ performs multiplication for the twiddle factors with respect to data output from the corresponding one of change-over switches 95-1 to 95-$k$ and outputs the result of multiplication. In this manner, the number of multipliers for twiddle factors can be reduced by ⅓.

Figure 9:
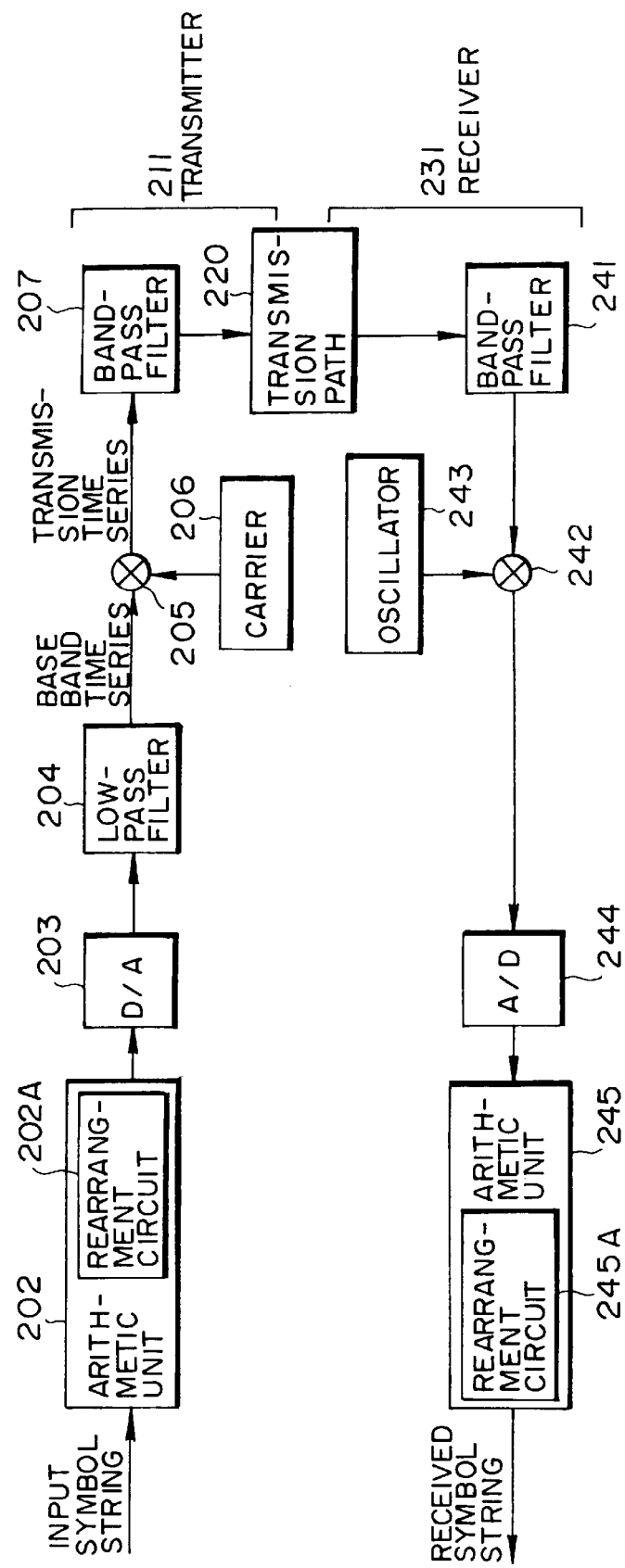
FIG. 9 is a block diagram showing the configuration of an example of an OFDM (orthogonal frequency division multiplex) transmitting and receiving system to which the Fourier transform arithmetic unit of the present invention is applied.
Figure 11:
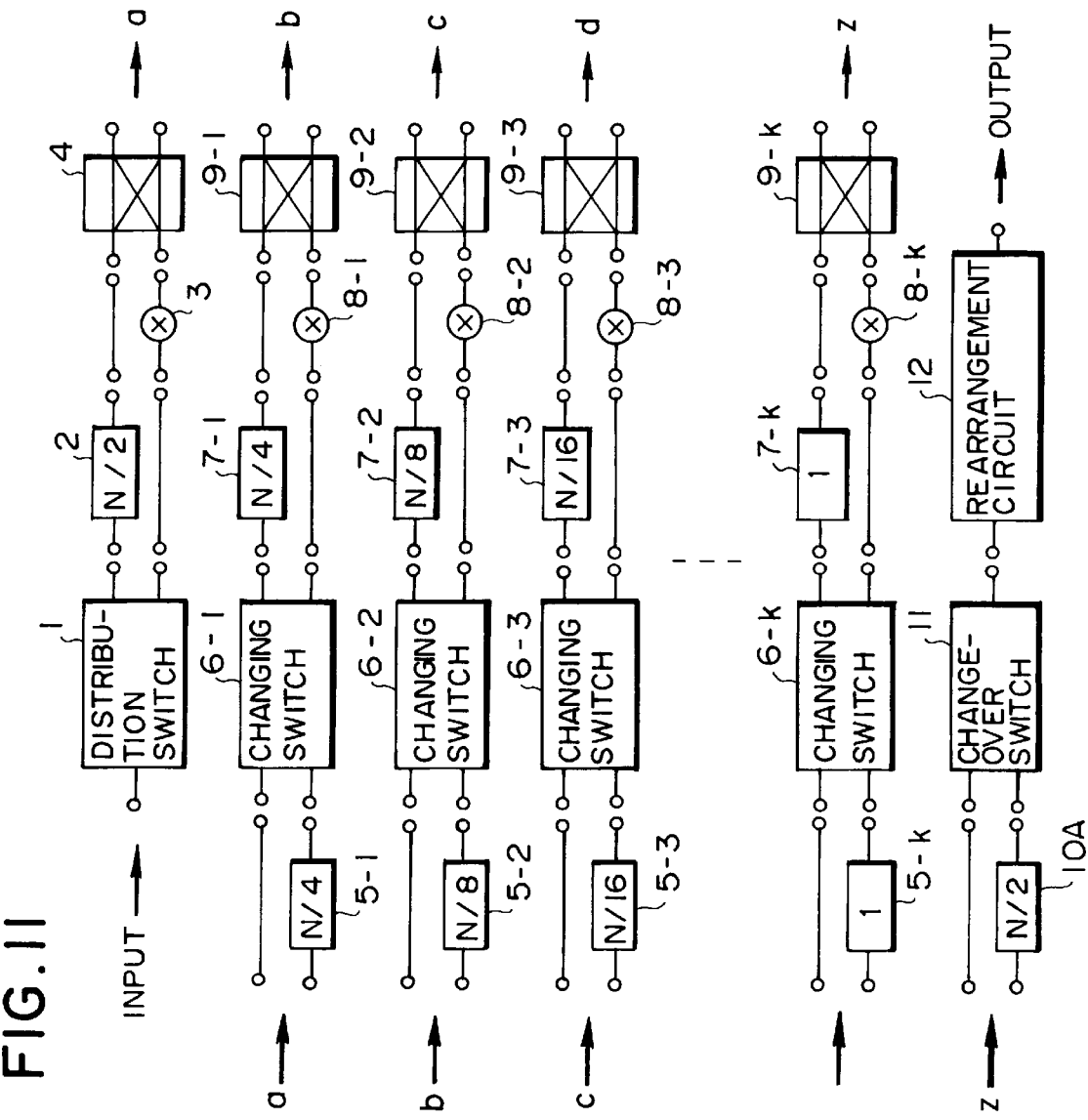
FIG. 11 is a block diagram showing the configuration of an example of a Fourier transform arithmetic unit.

Operations for fast Fourier transform can be performed by each of the circuit arrangements described above as embodiments of the present invention. Each of Fourier transform arithmetic units in accordance with the above-described embodiments can be applied to an apparatus such as that shown in FIG. 9, for example, FIG. 9 shows an orthogonal frequency division multiplex (OFDM) transmitting and receiving system, which is basically formed of a transmitter 211 and a receiver 231 which receives data transmitted from the transmitter 211 via a transmission path 220.

In the transmitter 211, an input symbol string is supplied to an arithmetic unit 202 containing a circuit for inverse fast Fourier transform (inverse FFT) of a pipeline type such as one of those described above. Inverse FFT can be realized by an arrangement which is basically equal to that for FFT, and which is modified only by changing the coefficients of multiplications in the multipliers for the twiddle factors from the corresponding coefficients in FFT if the radix is 2. If radix is larger than 2, the arrangement can readily be modified by providing a change-over switch in an input or output section for each butterfly operation device together with changing the multiplication factors.

In this arithmetic unit 202, an rearrangement circuit 202A for rearranging outputs from the above-mentioned pipeline type inverse FFT circuit is incorporated. When the rearrangement circuit 202A is supplied with data input successively, e.g., data items G0 to G15 shown in FIG. 10, it outputs data items, G0, G8, G4, G12, G2, G10, G6, G14, G1, G9, G5, G13, G3, G11, G7, and G15 in this order.

This output order is determined by bit reverse. That is, if the numbers 0 to 15 indicating the order of data items G0 to G15 are expressed by binary notation, they are 0000, 0001, 0010, . . . , 1111. From these binary numbers, binary numbers are obtained by taking the numerals not from the most significant bit but from the least significant bit. The obtained binary numbers express the output order.

The arithmetic unit 202 processes the input symbol string by inverse FFT. The number of points of this inverse FFT is the same as the number of carriers of the input transmitted data modulated by quadrature phase shift keying (QPSK). Inverse FFT can be regarded as a transform from a frequency region to a time region.

The output from the arithmetic unit 202 is input to a D/A converter circuit 203 to be converted from digital form into analog form. The output from the D/A converter 203 is input to a low-pass filter 204 to extract a time series signal in a base band. This signal is input to a multiplier 205 and is multiplied by a carrier output from a carrier generating circuit 206 to be generated into a radio frequency signal at a desired frequency. From this radio frequency signals, a signal in a predetermined pass band is extracted by a band-pass filter 207 to be transmitted through the transmission path 220.

In the receiver 231, only the signal in the predetermined band is extracted from the signal supplied from the transmission path 220 by a band-pass filter 241 and is supplied to a multiplier 242. The multiplier 242 multiplies the input signal by a signal at the predetermined frequency output from an oscillator 243 to obtain base band signal components. An A/D converter circuit 244 converts the output from the multiplier 242 from analog form into digital form, and outputs the converted signal to an arithmetic unit 245 in which the above-described pipeline type FFT circuit and an rearrangement circuit 245A for rearranging the output from the FFT circuit are incorporated.

The arithmetic unit 245 processes the input data by FFT processing. FFT processing can be regarded as a transform from a time region to a frequency region.

Each of the rearrangement-circuits 202A and 245A may be provided in an input section of the pipeline type FFT circuit instead of being provided in an output section. In such a case, the delay time in the processing circuits forming a certain number of processing states is set in such a manner as to be shortest in the initial stage and to be longer in each subsequent stage than in the preceding stage.

Thus, an OFDM transmitting and receiving system can be realized in which the interval of symbols (symbol value) is increased so that the system is not easily affected by a delay time due to reflected waves, and which is therefore strong against multipath interference.

What is claimed is:

1. A Fourier transform arithmetic unit having a plurality of processing stages for performing fast Fourier transform by pipeline processing, each of said plurality of processing stages comprising:

division means for dividing input data corresponding to one symbol into a plurality of groups of data;

delay means for delaying, by a predetermined period of time, at least a group of data most advanced with respect to time in the plurality of groups of data from said division means;

feedback means for supplying the group of data output from said delay means back to said delay means a predetermined number of times until a time when a group of data most delayed with respect to time is output from said division means;

operation means for performing a butterfly operation on the plurality of groups of data from said division means to obtain a plurality of operation results, the plurality of groups of data being input to said operation means simultaneously; and multiplexing means for multiplexing the plurality of operation results from said operation means with respect to time to obtain a multiplexed output.

2. An arithmetic unit according to claim 1, wherein said operation means comprises first operation means and each of said plurality of processing stages further includes second operation means for performing an operation for twiddle factors with respect to the multiplexed output from said multiplexing means.

3. An arithmetic unit according to claim 1, wherein the plurality of processing stages comprise 1 to k stages and said delay means of the kth one of said processing stages has a delay time expressed by $N/R^k$ where N is the number of data points of the Fourier transform, R is a radix, and k is a positive integer.

4. An arithmetic unit according to claim 3, wherein said division means divides said input data corresponding to one symbol into R groups of data.

5. An arithmetic unit according to claim 4, wherein said division means comprises change-over means for changing destinations of the R groups of data in a cycle having a time period corresponding to $N/R^k$.

6. An arithmetic unit according to claim 1, wherein said delay means includes first delay means and said feedback means includes first feedback means and wherein said multiplexing means includes:

second delay means for delaying at least one of the plurality of operation results from said operation means by a predetermined amount of time;

change-over means for changing and outputting delayed operation results delayed by said second delay means; and second feedback means for supplying an operation result output from said second delay means back to said second delay means a predetermined number of times until a time when the delayed operation results are changed by said change-over means.

7. An arithmetic unit according to claim 6, wherein delay time periods of said first delay means and said second delay means in same one of said plurality of processing stages are equal.

8. An arithmetic unit according to claim 6, wherein said first delay means and said second delay means are formed by a single delay device, and said first feedback means and said second feedback means are formed by a single connecting circuit.

9. An arithmetic unit according to claim 8, wherein delay time periods of said first delay means and said second delay means in the same processing stage are equal.

10. A Fourier transform arithmetic unit having a plurality k of processing stages for performing fast Fourier transform by pipeline processing, where k is a positive integer, each of said plurality of processing stages comprising:

timing control means for performing timing control by dividing input data corresponding to one symbol into a plurality of groups of data and for delaying at least one of the plurality of groups of data, so that the plurality of groups of data are output simultaneously;

first operation means for performing a butterfly operation on the plurality of groups of data from said timing control means to obtain a plurality of operation results, the plurality of groups of data being input to said first operation means from said timing control means simultaneously;

delay means for delaying the plurality of operation results output from said first operation means;

multiplexing means for arranging the plurality of operation results from said delay means in a time division multiplexing manner to obtain a multiplexed output; and second operation means for performing an operation of twiddle factors on the multiplexed output from said multiplexing means.

11. An arithmetic unit according to claim 10, wherein said delay means included in said multiplexing means is also used for timing control processing in said timing control means, so that the plurality of groups of data are output simultaneously.

12. An arithmetic unit according to claim 10, wherein a delay means of the kth one of said plurality of processing stages comprises a plurality of delay devices, each having a delay time expressed by $N/R^k$, where N is a number of data points of the Fourier transform and R is a radix.

13. An arithmetic unit according to claim 12, wherein said timing control means divides said input data corresponding to one symbol into R groups of data.

14. An arithmetic unit according to claim 13, wherein said timing control means includes change-over means for changing destinations of the R groups of data in a cycle having a time period corresponding to $N/R^k$.

15. A Fourier transform arithmetic unit having a plurality of processing stages for performing fast Fourier transform by pipeline processing, each of said plurality of processing stages comprising:

input delay means including delay devices for delaying input data by a predetermined period of time connected in series;

operation means supplied with input data from an input terminal and with delayed data from an output terminal of said input delay means and with data from points of connection between said plurality of delay devices, said operation means performing a butterfly operation using the data supplied thereto to output a plurality of operation results;

output delay means for delaying the plurality of operation results from said operation means; and multiplexing means for arranging the plurality of delayed operation results from said output delay means with respect to time to obtain a multiplexed output.

16. An arithmetic unit according to claim 15, wherein said operation means comprises first operation means and each of said plurality of processing stages further comprises second operation means for performing an operation for twiddle factors with respect to the multiplexed output from said multiplexing means.

17. An arithmetic unit according to claim 15, wherein said output delay means and said input delay means share a common delay circuit.

18. A Fourier transform operation method for performing fast Fourier transform by pipeline processing using a plurality of processing stages, said method comprising performing in each of the plurality of processing stages the steps of:

dividing input data corresponding to one symbol into a plurality of groups of data;

variously delaying the plurality of divided groups of data so that the plurality of divided groups of data from said step of dividing are output simultaneously;

obtaining a plurality of operation results by performing a butterfly operation on the groups of data output simultaneously;

multiplexing the plurality of operation results in a time division multiplexing manner to obtain a time-division-multiplexed output; and performing an operation for twiddle factors with respect to the time-division-multiplexed output.

* * * * *